United States Patent
Elliott et al.

(10) Patent No.: US 10,676,332 B2
(45) Date of Patent: Jun. 9, 2020

(54) SETUP AND CONTROL OF A WIRELESS LIFT SYSTEM

(71) Applicant: Vehicle Service Group, LLC, Madison, IN (US)

(72) Inventors: Robert William Elliott, Madison, IN (US); Darian Smith, Hanover, IN (US); Kevin S. Katerberg, Madison, IN (US); Austin Deuerling, Madison, IN (US); Doug Spiller, Madison, IN (US); Doug Brown, Campbellsburg, IN (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

(21) Appl. No.: 15/769,952

(22) PCT Filed: Oct. 21, 2016

(86) PCT No.: PCT/US2016/058254
§ 371 (c)(1),
(2) Date: Apr. 20, 2018

(87) PCT Pub. No.: WO2017/070564
PCT Pub. Date: Apr. 27, 2017

(65) Prior Publication Data
US 2018/0354760 A1    Dec. 13, 2018

Related U.S. Application Data

(60) Provisional application No. 62/244,514, filed on Oct. 21, 2015.

(51) Int. Cl.
*B66F 3/46* (2006.01)
*H04W 76/15* (2018.01)
*G01S 5/02* (2010.01)

(52) U.S. Cl.
CPC .............. *B66F 3/46* (2013.01); *G01S 5/0289* (2013.01); *H04W 76/15* (2018.02)

(58) Field of Classification Search
CPC ............ B66F 3/00–46; B66F 5/00–04; H04W 76/15; G01S 5/0289
See application file for complete search history.

(56) References Cited

U.S. PATENT DOCUMENTS

| | | |
|---|---|---|
| 7,191,038 B2 | 3/2007 | Chase |
| 9,661,128 B2 | 5/2017 | Hodge et al. |
| | (Continued) | |

OTHER PUBLICATIONS

International Search Report and Written Opinion for International PCT Application No. PCT/US2016/058254 entitled, "Setup and Control of a Wireless Lift System," filed Oct. 21, 2016.

(Continued)

*Primary Examiner* — Raymond S Dean
(74) *Attorney, Agent, or Firm* — Frost Brown Todd LLC

(57) ABSTRACT

A plurality of portable lifts are dynamically configured to form a lift system for raising and lowering of vehicle. Each portable lift is added to the lift system and communicates wirelessly with a centralized control module. Some systems guide the user through a sequenced association of lifts in particular relative positions around the vehicle, while others use automatic position-detection techniques to determine those relative positions without explicit user input. Some systems allow definition of subsystems that can be operated together. Flexible controls may selectively allow operation of individual lifts, pairs or subsystems of lifts, or the full system at once. Controls on each lift may communicate commands for other lifts by way of the centralized control module.

17 Claims, 14 Drawing Sheets

(56) References Cited

U.S. PATENT DOCUMENTS

| | | | |
|---|---|---|---|
| 9,908,764 B2 | 3/2018 | Elliott et al. | |
| 10,059,576 B2 | 8/2018 | Jaipaul et al. | |
| 10,081,523 B2 | 9/2018 | Brown et al. | |
| 10,124,997 B2 * | 11/2018 | Jaipaul | B66F 3/46 |
| 10,569,999 B2 | 2/2020 | Van Houten et al. | |
| 2002/0175319 A1 | 11/2002 | Green et al. | |
| 2004/0026180 A1 | 2/2004 | Baker | |
| 2005/0045429 A1 | 3/2005 | Baker | |
| 2009/0236183 A1 | 9/2009 | Bordwell et al. | |
| 2010/0013674 A1 | 1/2010 | Biondo et al. | |
| 2011/0037041 A1 * | 2/2011 | DeJong | B66F 3/46 |
| | | | 254/89 R |
| 2012/0018688 A1 | 1/2012 | Finkbeiner | |
| 2013/0240300 A1 | 9/2013 | Fagan et al. | |
| 2014/0264203 A1 | 9/2014 | Elliott | |
| 2014/0324214 A1 | 10/2014 | Elliott | |
| 2015/0246797 A1 | 9/2015 | Jaipaul et al. | |
| 2018/0194604 A1 | 7/2018 | Elliott et al. | |

OTHER PUBLICATIONS

U.S. Appl. No. 14/080,240, filed Nov. 14, 2013, entitled: "Vehicle Lift with Locally Stored Energy Source."

U.S. Appl. No. 61/726,832, filed Nov. 15, 2012, entitled: "Vehicle Lift with Locally Stored Energy Source."

U.S. Appl. No. 61/783,408, filed Mar. 14, 2013, entitled: "Handheld Control Unit for Automotive Lift."

\* cited by examiner

SETUP AND CONTROL OF A WIRELESS LIFT SYSTEM

BACKGROUND

Vehicle lift systems may be used to lift various kinds of vehicles relative to the ground. Some vehicle lift systems are formed by a set of mobile, above-ground lift columns. An example of a mobile column lift system is the MACH 4 Mobile Column Lift System by Rotary Lift of Madison, Ind. The mobile columns may be readily positioned in relation to the vehicle. The mobile columns may then be activated to lift the vehicle from the ground in a coordinated/synchronized fashion. The mobile columns may be controlled through wireless communication with a wireless control center. The wireless control center may associate with each mobile column in order to form a synchronized lift. While a variety of systems and configurations have been made and used to control lift systems, it is believed that no one prior to the inventors has made or used the invention described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

DETAILED DESCRIPTION

The following description of certain examples should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Mobile Column Lift System Overview

Figure 1:
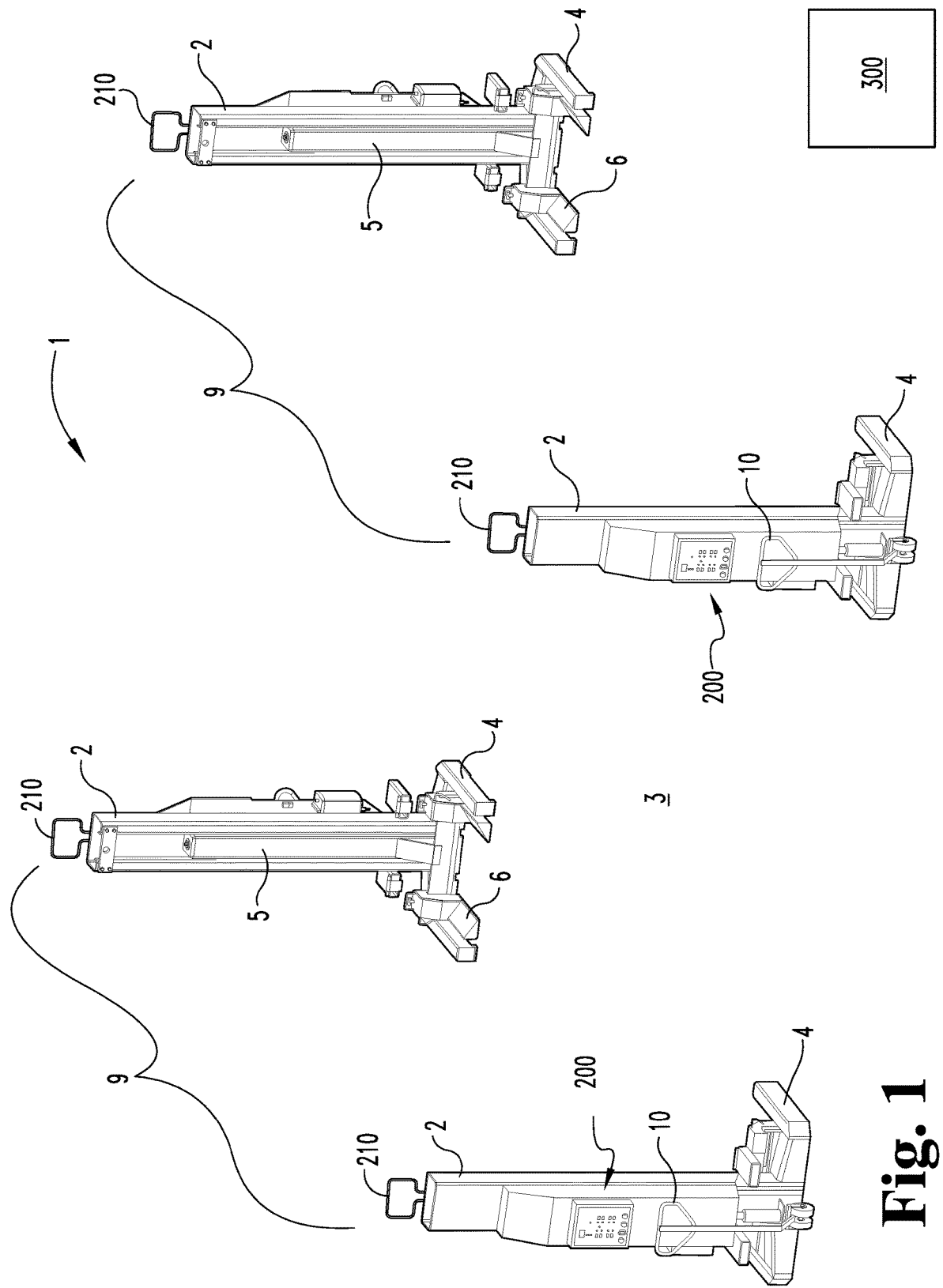
FIG. 1 shows a perspective view of an exemplary lift system.
Figure 2:
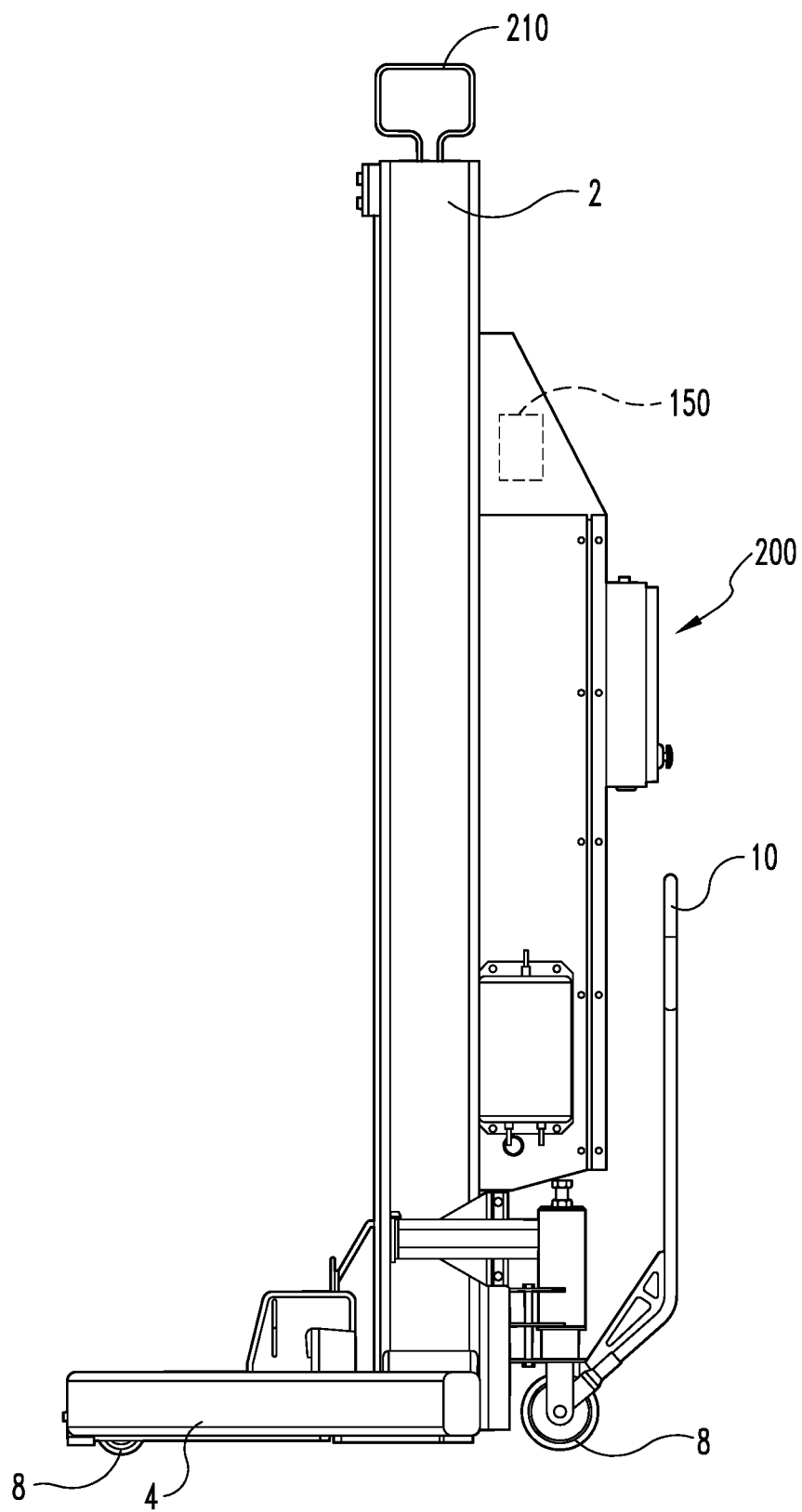
FIG. 2 shows a side view of an exemplary lift column in the lift system of FIG. 1.
Figure 3:
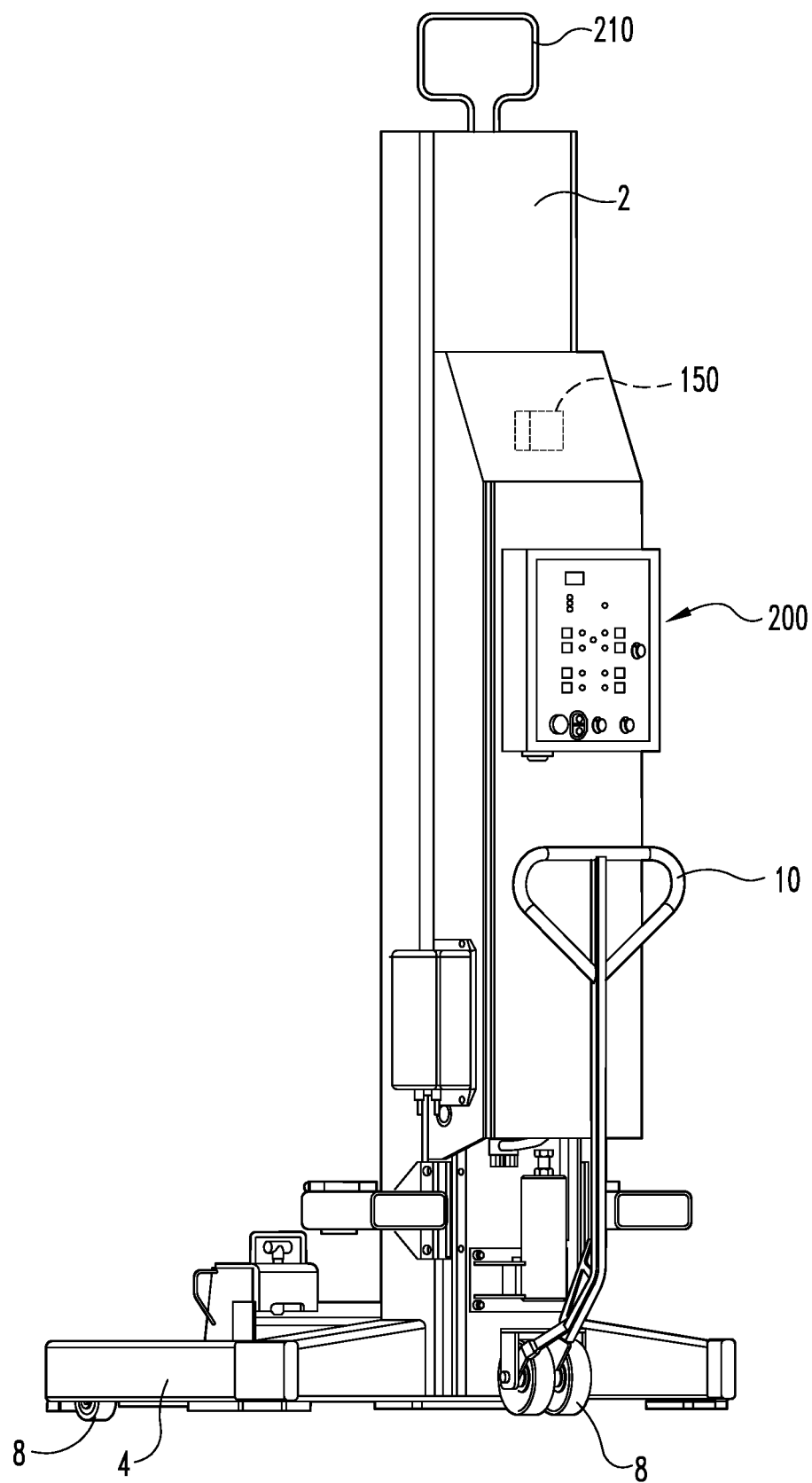
FIG. 3 shows a rear perspective view of the lift column of FIG. 2.
Figure 5:
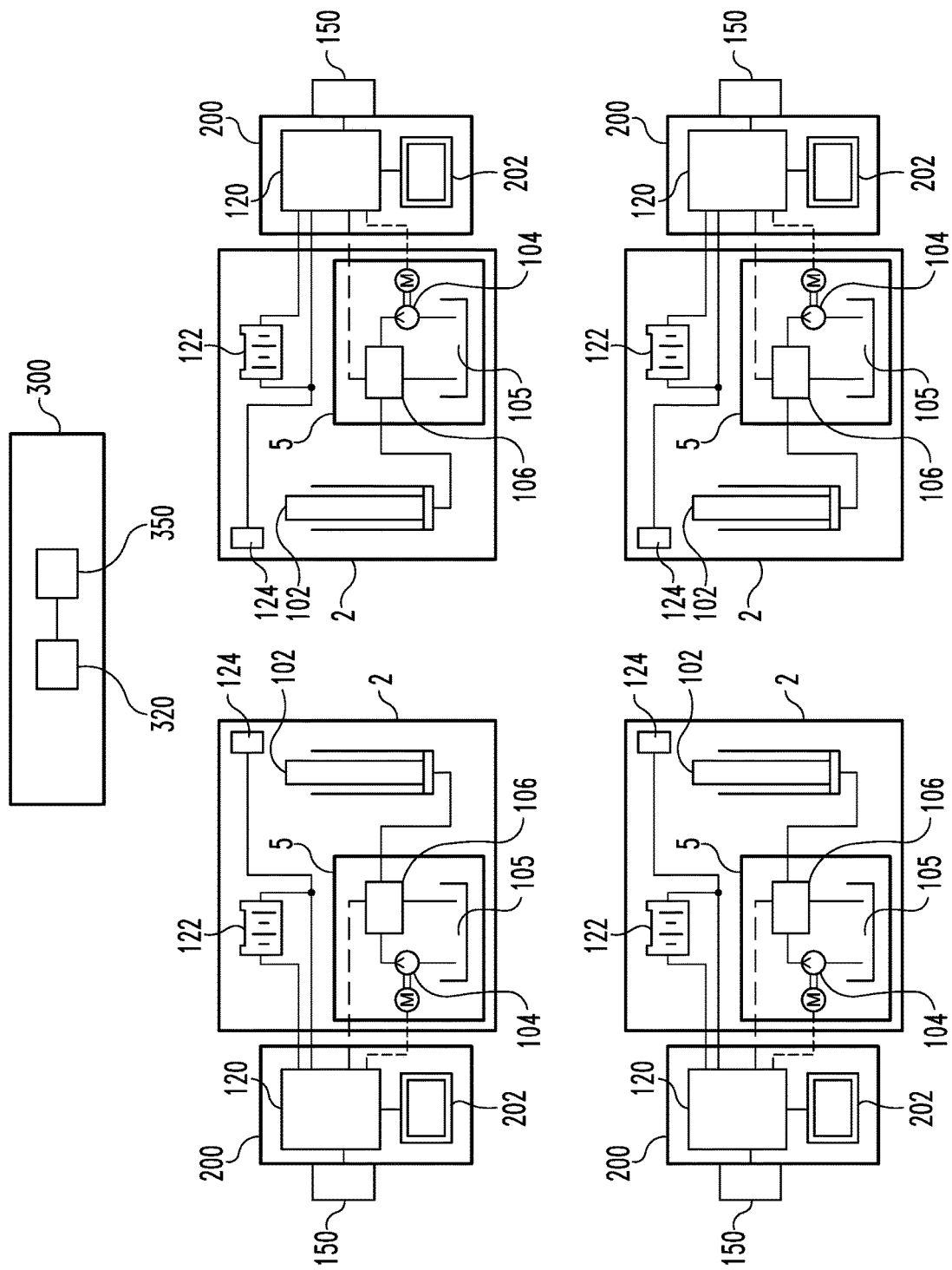
FIG. 5 shows a schematic diagram of the lift system of FIG. 1.

FIGS. 1 and 5 illustrate an exemplary lift system (1) comprising a plurality of subsystems (9) and a centralized control module (300). Each lift subsystem (9) comprises two mobile lifting columns (2). In other embodiments, mobile lifting columns (2) are of the parallelogram type, cylinder type, scissor type, in-ground, or other lift types as will occur to those skilled in the art. Control module (300) is operable to control lifting columns (2) to selectively raise or lower a vehicle relative to the ground (3). While two lift subsystems (9) and four columns (2) are shown, it should be understood that any other suitable number of lift subsystems (9) and columns (2) (e.g., six, eight, etc.) may be used to form lift system (1). Each lifting column (2) includes a set of legs (4) that support lifting column (2) in relation to the ground (3). As shown in FIGS. 2-3, columns (2) also have wheels (8) and handles (10), permitting columns (2) to be moved along ground (3). Columns (2) may thus be selectively positioned with relative ease, as may be desired to accommodate different vehicles having different wheel spacing or numbers of wheels (e.g., to move additional columns (2) into place or to move excess columns (2) away, etc.), to replace a first column (2) with a second column (2) for maintenance of the first column (2), etc.

Figure 4:
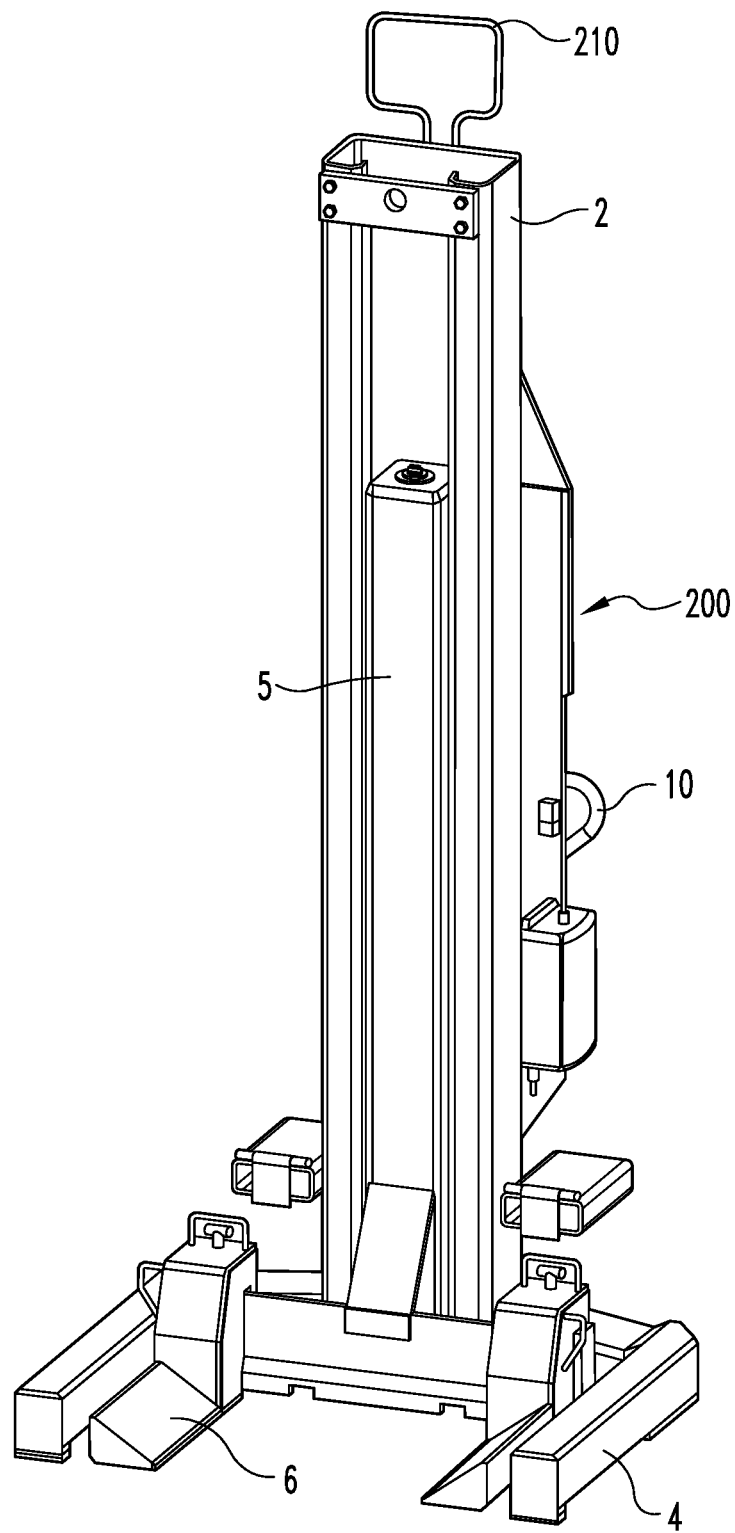
FIG. 4 shows a front perspective view of the lift column of FIG. 2.

As shown in FIGS. 4-5, each column (2) further comprises a hydraulic system (5), which is operable to move a carriage (6) vertically relative to the ground (3). Carriage (6) is configured to engage a component of the vehicle (e.g., the wheel, etc.), to thereby raise and lower the vehicle relative to the ground (3). In the embodiment illustrated in FIG. 5, each hydraulic system (5) of the present example comprises a hydraulic cylinder and piston (102), a pump (104) and a series of valves (106) controlling the flow of hydraulic fluid stored within a reservoir (105). In particular pump (104) and valves (106) are in fluid communication with hydraulic cylinder and piston (102), such that pump (104) and valves (106) communicate fluid to or from cylinder and piston (102). Carriage (6) ascends and descends with the piston of hydraulic cylinder and piston (102), such that pump (104) and valves (106) may be controlled to control the vertical height at which carriage (6) is positioned. A processor (120) is in electrical communication with pump (104) and valves (106) to control operation of pump (104) and valves (106). Of course, any other suitable structures, components, or techniques may be used for a hydraulic system (5) as will occur to those skilled in the art. For instance, any suitable systems, features, mechanisms, or components may be used in addition to or in lieu of hydraulic system (5), including but not limited to a screw mechanism, such as to raise or lower carriage (6).

Each lift column (2) further includes a control interface (200), which may be used to control the operation, monitoring, and/or programming of lift system (1). For instance, control interface (200) may be used to define ad hoc column control groups based on available columns (2); then control columns (2) in the ad hoc column control group. Control interface (200) also has a display (202) that is configured to provide the operator with visual indication of which columns (2) have been assigned to the ad hoc column control group. Display (202) may include a graphical representation of a vehicle and graphical representations of the available columns (2) positioned in relation to the graphical representation of the vehicle. Control interface (200) may illuminate the graphical representations of the available lift columns (2) that have been selected for the ad hoc control group, providing the operator with immediate visual confirmation of which columns (2) have been selected and where those columns (2) are in relation to the vehicle. Control interface (200) may alternatively or additionally illuminate the graphical representations of (or an indicator adjacent to) the position of the particular column (2) relative to a vehicle being lifted. Control interface (200) is in communication with processor (120), which is operable to process and relay information/commands to/from control interface.

By way of example only, control interface (200) may be configured and operable in accordance with at least some of the teachings of U.S. Pat. No. 8,083,034, entitled "Lift Control Interface," issued Dec. 27, 2011, the disclosure of which is hereby incorporated by reference herein. As another merely illustrative example, control interface (200) and/or other aspects of lift system (1) may be configured and operable in accordance with at least some of the teachings of U.S. Pat. No. 6,983,196, entitled "Electronically Controlled Vehicle Lift and Vehicle Service System," issued Jan. 3, 2006, the disclosure of which is hereby incorporated by reference herein.

In this illustrated embodiment, a wireless transceiver (150) is also provided at each column (2), and is operable to wirelessly relay information and commands between that column (2) and centralized control module (300) as will be described in greater detail below. Various suitable forms that wireless transceiver (150) may take, including without limitation Bluetooth, Wi-Fi, Zigbee-compliant, and other wireless transceivers and hardware, and a variety of lift types to which they can be applied will be apparent to those of ordinary skill in the art in view of the teachings herein. As an alternative to wireless communication, cables may be used to provide wired communication of information/commands between each column (2) and centralized control module (300).

Each column (2) in some embodiments further includes a weight sensor (124) in communication with the corresponding processor (120). Weight sensor (124) is attached to column (2) in such a way as to measure the load on carriage (6). Processor (120) is configured to calculate sudden changes in load on carriage (6) based on data from weight sensor (124). If processor (120) calculates a sudden change in load on carriage (6) based on data from weight sensor (124), processor (120) may signal an error message to control module (300), which would further transmit the error message to all other columns (2), in response to which system (1) changes to a secure, stopped state to prevent raising or lowering of carriages (6). This feature may be utilized in case an object obstructs system (1) from raising or lowering a vehicle. This feature may also be utilized if there is a sudden shift in loads between different columns (2) in system (1). This feature may be utilized in any suitable manner apparent to one having ordinary skill in the art in view of the teachings herein.

Each lift column (2) further includes an indicator (210) connected with control interface (200). Indicator (210) may include a light, a speaker, or any other suitable form of communication to signal a message or information to those in the vicinity of lift column (2). Indicator (210) may be activated in response to information delivered from various kinds of sensors, such as weight sensor (124) on column (2). Additionally, as will be described in greater detail below, indicator (210) may be activated based on information that control module (300) sends to interface (200).

Columns (2) may also be configured to automatically stop raising or lowering carriage (6) at a specified height, such as eight inches or two feet. A foot switch or other intentionally activated release may be required in some embodiments to lower columns (2) past the point where columns (2) are configured to automatically stop.

As also shown in FIG. 5, each column (2) includes a respective battery (122). Batteries (122) in the illustrated embodiment are rechargeable and are operable to power all aspects of operation of their respective columns (2). In particular, each battery (122) is operable to power the pump (104), control interface (200), indicator (210), weight sensor (124), transceiver (150), and any other electrically powered component in each column (2). By way of example only, such operability may be provided in accordance with at least some of the teachings of U.S. Provisional Patent App. No. 61/726,832, entitled "Vehicle Lift with Locally Stored Energy Source," filed Nov. 15, 2012, the disclosure of which is hereby incorporated by reference herein. In addition or in the alternative, at least part of each column (2) may receive power from an external source via one or more wires or in some other suitable fashion. In addition or in the alternative, each column (2) may receive power via one or more wires from another column (2) to form a chain of columns, while one column (2) receives power from an external power source via one or more wires, and all other columns receive power from the external power source indirectly via the chain of columns connected to each other via wires.

In various embodiments, system (1) comprises a lock mechanism that can hold each carriage (6) of each column (2) from traveling down in various scenarios where that downward motion is undesirable. For example, in some systems, centralized control module (300) can receive a user command to lower the carriage (6) of each column (2) to a position where the weight of the vehicle is being supported mechanically by the structure of column (2) rather than the hydraulic lift system. Likewise, centralized control module (300) can receive a user command to raise the carriage (6) of each column (2) out of the locked position so that the hydraulic system again supports the weight of the vehicle. In some embodiments, this locking/unlocking functionality is structured as described in U.S. patent application Ser. No. 14/705,208, filed on May 6, 2015, and titled "Load Indicator for Vehicle Lift," while other implementations and embodiments will occur to those skilled in the art in view of this disclosure.

As described above, column (2) is in the fully locked position when carriage (6) has been lowered to fully engage locking assembly (250). When in this position, the hydraulic fluid in hydraulic cylinder (5) may be at least partially relieved of pressure. In other words, the load carried by column (2) may be shifted from being supported by a hydraulic cylinder (5) to being at least partially supported by a locking assembly (250). In this mode of operation, pressure in hydraulic cylinder (5) and the rest of the hydraulic circuit may act to indicate whether column (2) is in a locked state. When the pressure in the hydraulic circuit is relatively high, this may indicate that the hydraulic circuit is bearing the weight of the lifted vehicle, which may further indicate that column (2) is in an unlocked state. When the pressure in the hydraulic circuit is relatively low, this may indicate that the mechanical components of locking assembly (250)

are bearing the weight of the lifted vehicle, which may further indicate that column (2) is in a locked state.

II. Exemplary Centralized Control

As noted above, lift system (1) of the present example comprises a centralized control module (300). By way of example only, centralized control (300) module may be housed in a structure that is separate from columns (2) but is situated in the same facility as columns (2). For instance, centralized control module (300) may be located in an upright console unit (e.g., configured like a podium) mounted to the ground (3) or on a wall. As another merely illustrative example, centralized control module (300) may be provided in a wired or wireless handheld pendant or other form of handheld control. For instance, control module (300) may be incorporated into a handheld control similar to the one disclosed in U.S. Provisional Patent App. No. 61/783,408, entitled "Handheld Control Unit for Automotive Lift," the disclosure of which is hereby incorporated by reference herein. As another merely illustrative example, centralized control module (300) may be provided through a program on a conventional multipurpose computing device such as a smartphone, laptop PC, desktop PC, etc. As yet another merely illustrative example, control module (300) may be provided through a remote server or some other remote device, such that control module (300) may communicate with columns (2) via various kinds of public networks (e.g., the internet) and/or private networks (e.g., WANs, LANs, VPNs, etc.). Various suitable forms that control module (300) may take will be apparent to those of ordinary skill in the art in view of the teachings herein.

As also noted above, columns (2) are operable in this illustrated embodiment to communicate wirelessly with control module (300) via transceivers (150). To that end, as shown in FIG. 5, control module (300) includes a wireless transceiver (350) in communication with a processor (320). It should therefore be understood that transceivers (150, 350) may be used to wirelessly communicate information/commands between processors (120, 320). By way of example only, transceivers (150, 350) may communicate via a conventional Wi-Fi protocol, via BLUETOOTH, via ZIGBEE, or in any other suitable fashion, protocol, or modality. While transceivers (150, 350) communicate directly in the present example, it should be understood that one or more other wireless/telecommunication components may be interposed between transceivers (150, 350) to relay and/or otherwise process communications between transceivers (150, 350).

As will be described in greater detail below, control module (300) may be used to initially set up lift system (1) by establishing communication with individual columns (2). Initial communication between control module (300) and columns (2) may allow control module (300) to identify individual columns (2) as members of lift system (1). Additionally, initial communication between control module (300) and columns (2) may allow control module (300) to identify individual columns as members of a lift subsystem (9). Each lift subsystem (9) may include a number (e.g., a pair) of columns (2) associated with one or more individual axles of a vehicle. This may allow for added functionality of lift system (1) to raise and lower individual axles of a vehicle to different respective heights. Additionally, if two columns (2) form a lift subsystem (9), control module (300) may be able to activate/deactivate or raise/lower both columns (2) in lift subsystem (9) by only pressing one button on control module (300) or otherwise entering a single command associated with lift subsystem (9) rather than two separate buttons or commands that are each associated with an individual column (2).

Some of these embodiments include control logic that maintains a maximum difference in height between lift subsystems (9) (such as 12" or 18"), and some of these embodiments allow a user to select the maximum difference. In some embodiments, the system (1) allows a maximum differential in height between columns (2) in a subsystem (9), and some of these embodiments have different differential limits depending on whether the subsystem (9) is supporting the front or rear of a vehicle, or depending in some other way on the axle being supported by that subsystem (9). In some embodiments the maximum differential allowed between columns (2) in the same subsystem (9) is different from the maximum differential allowed between subsystems (9), while in others the maximum differentials are the same.

In the present example, processor (320) of control module (300) serves as a master control while processors (120) of columns (2) serve as slave controls. Each processor (120) may provide processor (320) with information such as the status of the associated carriage (6), the status of one or more other components within the associated column (2), user inputs received via interface (200), and/or other information relating to column (2). Such information from processors (120) may be based at least in part on data from various kinds of sensors and/or other sources in columns (2) as will be apparent to those of ordinary skill in the art in view of the teachings herein.

In some embodiments, lift controls that are part of an interface (200) on a column (2) can send (or can be configured to send) commands to the centralized control module (300). For example, a user might use one or more components of an interface (200) on a column (2) to have the centralized control module (300) have all columns (2) move up together, move down together, raise the vehicle to a maximum height, or lower the vehicle to the ground. In some embodiments that allow definition of subsystems (9), the lift controls of interface (200) on a particular column (2) can be configured to cause operation of system (1) in single (i.e., actuation of one column (2) at a time), subsystem-wise (i.e., actuation of a particular subsystem (9) independently from the rest of system (1)), or full-system (i.e., actuation of all columns (2) in the system (1)) mode, accepting a single input and causing actuation of one or more columns (2) as a function of the selected mode.

Processor (320) processes the information from processors (120) and provides processors (120) with commands that processors (120) execute to control operation of columns (2). Processor (320) may also provide information to processors (120). For instance, processor (320) may provide processors (120) with information such as lift system (1) mode status, desired ascent/descent speed data, raise/lower commands, user display (202) information, and/or other kinds of information via transceivers (150, 350).

While each column (2) of the present example includes its own interface (200), it should be understood that control module (300) may have its own interface (200) in addition to or in lieu of each column (2) having its own interface (200).

In the present examples, processors (120) do not engage in any direct communication with each other via transceivers (150). However, in some other embodiments, processors (120) may communicate with each other via transceivers (150). Such inter-processor (120) communication take place in addition to or in lieu of communication with control module (300).

While control module (300) is shown as being part of a single lift system (1) with one set of columns (2), it should be understood that control module (300) may be associated with several different lift systems (1), each system (1) having its own set of columns (2). Each set of columns (2) may be operable to lift different vehicles within the same facility or in different facilities. A single control module (300) may thus be used to control lifting of several vehicles simultaneously and/or lifting of different vehicles in different geographic locations, if desired.

Control module (300) may also utilize transceiver (350) to communicate with or through an outside network in order to store data concerning the system (1) or specific columns (2), such as usage time, weight carried, maximum weight carried, number of errors received, and any other information that will be apparent to a person having ordinary skill in the art in view of the teachings herein.

Additionally, while control module (300) is described here as controlling mobile columns (2), it is envisioned that control module (300) could be compatible with different types of vehicle lifts as would be understood by a person having ordinary skill in the art in view of the teachings herein. In other words, control module (300) may be synchronized to work with an in-ground lift, a scissor lift, or any other type of lift known in the art.

Figure 6:
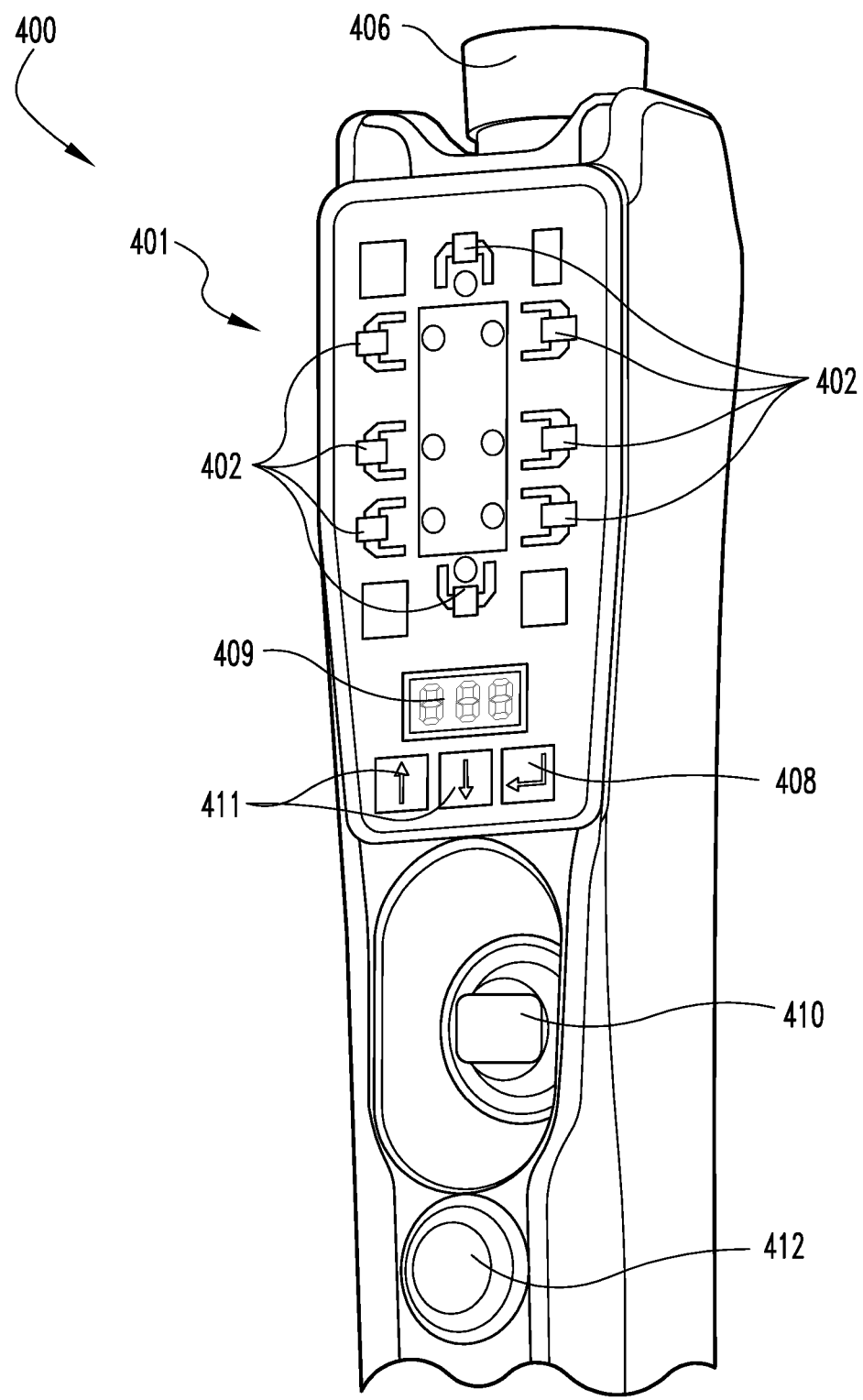
FIG. 6 shows a perspective view of an exemplary wireless pendant that may be used with the lift system of FIG. 1.
Figure 7:
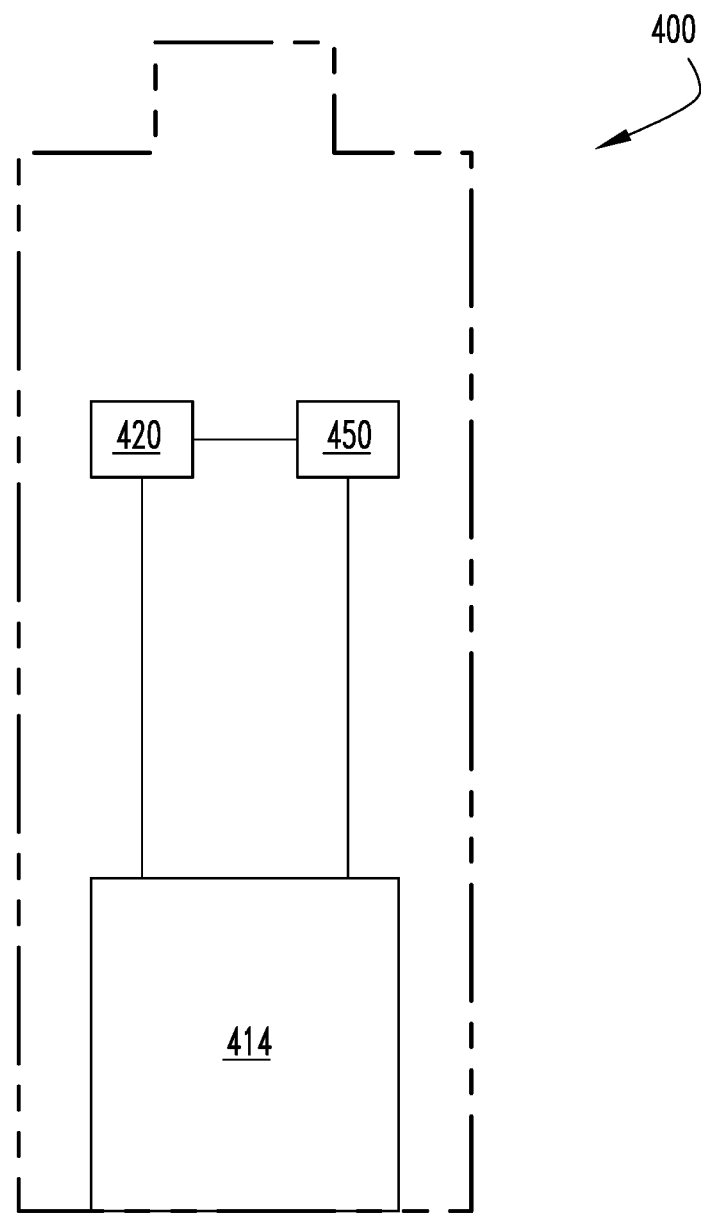
FIG. 7 shows a block diagram of the wireless pendant of FIG. 6.

FIGS. 6-7 show an exemplary wireless pendant (400) that may be used in the same or similar manner as control module (300), though with additional functionality. As seen in FIG. 7, similar to control module (300), wireless pendant (400) houses a processor (420), a wireless transmitter (450), and a battery (414). Battery (414) powers wireless pendant (400) and may be in direct or indirect electrical communication with processor (420) and wireless transmitter (450). Processor (420) and wireless transmitter (450) are in communication with each other as well may be physically and/or operationally substantially the same as processor (320) and wireless transmitter (350) mentioned above. Therefore, wireless pendant (400) is capable of communicating with wireless transceivers (150) and processors (120) of control interface (200) to control column (2) or groups of columns (2) in system (1) or one or more subsystems (9). Wireless pendant (400) also includes its own interface (401) to allow for user input to control system (1). Interface (401) may have a plurality of column avatars (402), a power button (404), an E-stop button (406), a numeral display (409), numeral controls (411), a numeral selector (408), actuation control (410), and re-activation ("wake") button (412), along with other controls as will occur to those skilled in the art in view of this disclosure.

Figure 8:
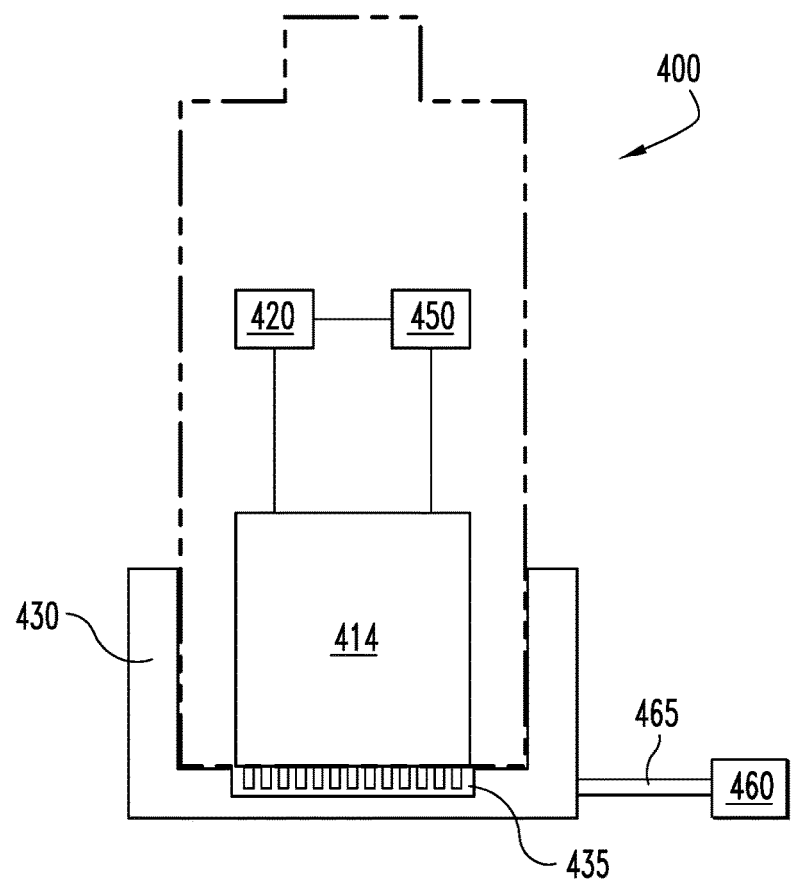
FIG. 8 shows a block diagram of the wireless pendant of FIG. 6 connected to an exemplary docking station.
Figure 9:
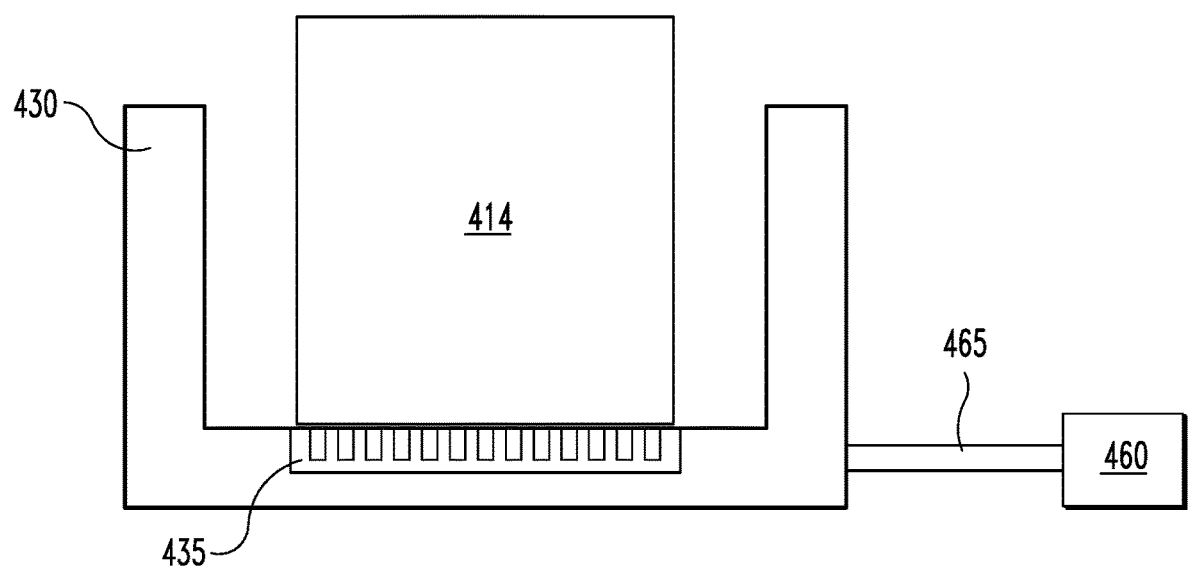
FIG. 9 shows a block diagram of the battery of the wireless pendant of FIG. 6 connected to the docking station of FIG. 8.
Figure 10:
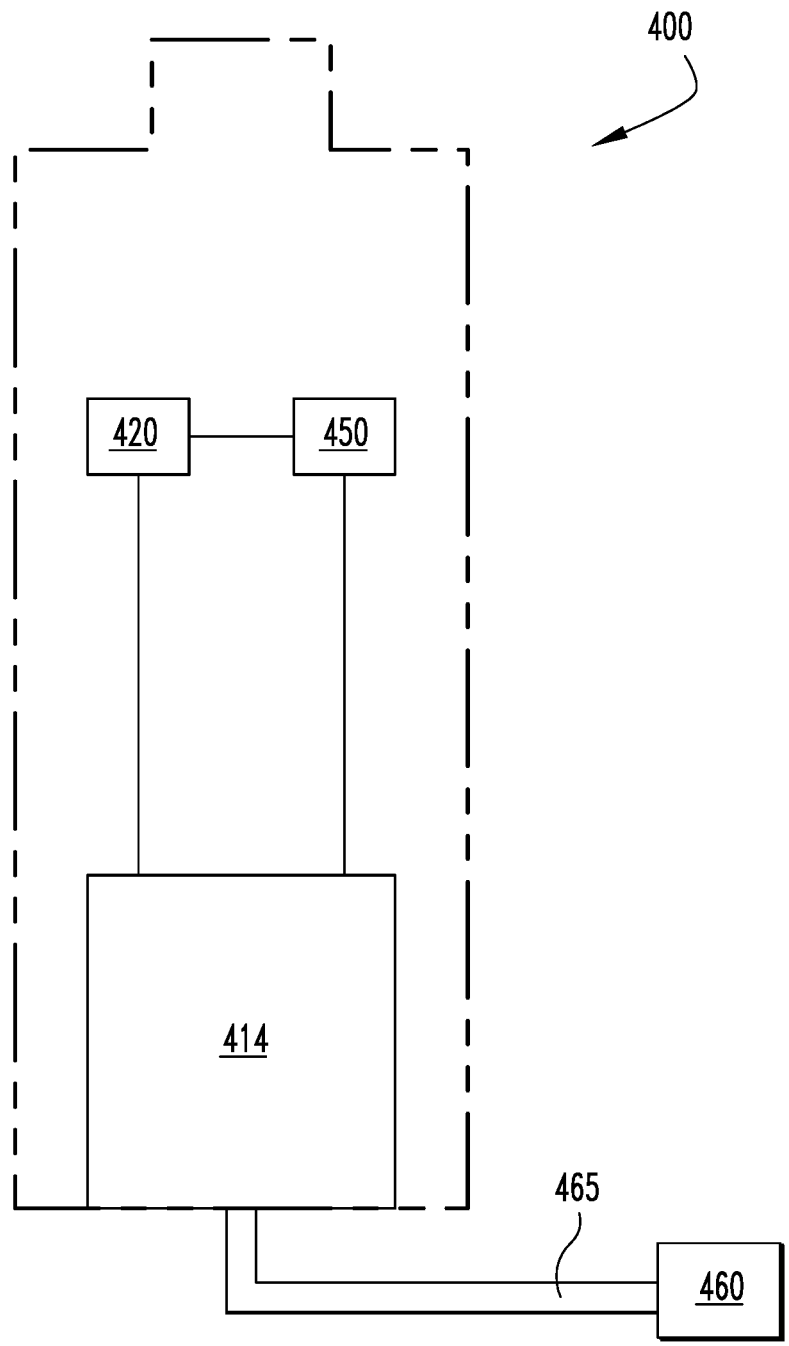
FIG. 10 shows a block diagram of the wireless pendant of FIG. 6 connected to a power source.

Battery (414) is configured to power wireless pendant (400). As illustrated in FIGS. 7-10, battery (414) may be coupled and decoupled to wireless pendant (400). Additionally, battery (414) may be charged by contact with or contactless connection to a charging port (435) in a docking station (430) on one or more columns (2), on a nearby wall, on a control podium, in a free-standing configuration, or in another configuration as will occur to those skilled in the art. Docking station (430) may further be in communication with a power cord (465) in communication with a power source (460). While the present example shows docking station (430) with one charging port (435), in other embodiments multiple charging ports (435) may be incorporated into a single docking station (430). Therefore, a single docking station may charge a plurality of batteries (414) simultaneously. FIG. 8 shows battery (414) still coupled to wireless pendant (400) charging on docking station (430). Alternatively, as shown in FIG. 9, battery (414) may attach to docking station (430) while decoupled from wireless pendant (400). Furthermore, as can be seen in FIG. 10, docking station (430) may be omitted altogether, with battery (414) connecting directly to power cord (465). As such, multiple batteries (400) may be charged with docking station (430) and without docking station (430).

Power button (404) is capable of activating wireless pendant (400). As will be described in greater detail below, numeral controls (408) are capable of scrolling through a set of numbers shown on numeral display (409), while numeral selector (408) allows an operator to choose (complete entry of) a displayed number. Numeral selector (408) may perform various functions, some of which may apply to initially setting up system (1). Such functions may include designating a broadcast channel through which wireless transceiver (450) will communicate, or selecting the number of columns (2) to associate with system (1). In the present example, numeral display (409) is an LCD screen, while numeral controls (411) and numeral selector (408) are a plurality of buttons. Alternatively, numeral display (409), numeral controls (411), and numeral selector (408) may all be located on a touch screen display, knob, or any other suitable means known to a person having ordinary skill in the art in view of the teachings herein. In other embodiments, users associate wireless pendant (400) with a series of columns (2), ending either with an explicit "end" command (such as by a button on wireless pendant (400) that is so labeled) or repeating the actions that associated wireless pendant (400) with the first of the columns (2) with the same meaningful result.

Actuation control (410) allows a user to selectively actuate columns (2) within system (1). Actuation control (410) includes a dynamic switch, giving a user the capabilities to determine the speed at which selectively actuated columns (2) raise or lower based on displacement of actuation control (410) from an off position. Valve (106) and pump (104) are configured to adjust to proportionally match the movement of actuation control (410). For example, if a user wishes to raise or lower selected columns (2) in system (1), a user may manipulate actuation control (410) in a direction associated with raising or lowering selected columns (2), and the further the user manipulates actuation control (410), the faster selected columns (2) lifts or lowers. It should be understood that actuation control (410) signals processor (420) to generate the information associated with raising or lowering selected columns (2), that information is then transferred from wireless pendant (400) via transceiver (450) to transceivers (150) of columns (2). Transceivers (150) then send this information to processors (120) of columns (2), which use this information to raise or lower that column (2). Actuation control (410) may be set up with a joystick control, a sliding-switch control, a sliding graphic on a touch screen, or any other control that would occur to a person having ordinary skill in the art in view of the teachings herein.

Column avatars (402) are configured to light up in order to graphically represent individual columns (2). Graphical representation of individual columns could be used to show that individual columns (2) have been activated or are (or are to be) incorporated into system (1). Additionally, any other suitable need for graphical representation of individual columns could be met as would occur to a person having ordinary skill in the art in view of the teachings herein. For example, as will be described in greater detail below, when a user is initially setting up system (1), column avatars (402)

may be configured to help instruct a user which column (2) in system (1) needs to be activated in order to help the system (1) understand the location of column (2) relative to the vehicle or other object being lifted. For example, column avatar (402) may light up with respect to the column (2) associated with the front axle on the driver's side of the vehicle being lifted. A user would then activate the column (2) at the front axle on the driver's side.

Column avatars (402) may also be configured to function as buttons allowing a user to select which column (2) they want to activate/deactivate within system (1). For example, if a user has already initially set up system (1) with columns (2) paired into subsystems (9) associated with specific axles, a user may wish to raise or lower a specific axle without affecting the height of other axles. In this case, a user may select the specific subsystem (9) they wish to raise or lower by pressing the column avatar (402) associated with that subsystem (9). The column avatar (402) associated with the selected subsystem (9) lights up, indicating to the user that subsystem (9) will raise or lower on command of actuation control (410) on wireless pendant (400). It should be understood that pressing buttons on column avatars (402) signals processor (420) to generate the information associated with activating, deactivating, or controlling selected columns (2), and that information is then transferred from wireless pendant (400) via transceiver (450) to transceivers (150) of one or more columns (2). Transceivers (150) then send this information to processors (120) of columns (2), which use the information to activate, deactivate, or control the respective column (2).

Additionally, the column avatar (402) associated with a particular column (2) in system (1) may light up (for example, in a particular color or with a particular flashing pattern) when that specific column (2) is being raised or lowered. In different contexts, column avatars (402) may light up with a plurality of colors, where each color signals different meanings to the user. For example, column avatars (402) may light up green or red, where green signals that column (2) associated with column avatar (402) is selected to raise or lower on command, and red signals that column (2) associated with column avatar (402) is not selected to raise or lower on command. Of course, column avatar (402) may signal any other information concerning individual columns (2), subsystems (9), or system (1) as would occur to one having ordinary skill in the art in view of the teachings herein.

Column avatars (402) may each contain a single- or multi-color LED configured to signal column activity to a user. Alternatively, column avatars (402) may all be located on an LCD display or a touch screen display.

Column avatars (402), or other lights on wireless pendant (400), may also be used to wirelessly signal if a carriage (6) is being lifted by hydraulics (5) or is being held in place by an exemplary locking mechanism. For instance, columns (2) may incorporate a system indicating distribution of loads similar to the one disclosed in U.S. patent application Ser. No. 14/705,028, entitled "Load Indicator For Vehicle Lift," the disclosure of which is hereby incorporated by reference herein. In other embodiments, if carriage (6) was lowering, and the system (1) detects that the carriage (6) has stopped for a particular period of time, the system (1) assumes that the carriage (6) is resting on the locking mechanism. Still other lock-detection mechanisms will occur to those skilled in the art in view of this disclosure.

In some embodiments, users can operate configuration interface elements on interface (200) of each column (2) to configure the columns (2) in system (1) without necessarily interacting directly with centralized control module (300). In such embodiments, the user might use interface (200) on a particular column (2) to select channels, select quantities of lift, indicate positions, and the like, and that column (2) would then transmit the data to centralized control module (300) and/or the other columns (2). The rest of the set up and operation procedures could proceed as described elsewhere herein.

E-stop (406) allows a user to stop actuation of columns (2) in system (1). When pushed, E-stop (406) may shut off pump (104). Alternatively, E-stop (406) may divert hydraulic fluid pressurized by pump (104) into reservoir (105) rather than into hydraulic cylinder and piston (102).

As will be described in greater detail below, reactivation button (412) allows a user to reactivate wireless pendant (400) after it is turned off or made dormant after a predetermined period of inactivity.

III. Exemplary System Set Up

As mentioned above, control module (300) or wireless pendant (400) may be used to associate individual columns (2) with lift system (1). In particular, control module (300) or wireless pendant (400) may use its wireless transceiver (320, 420) to communicate with wireless transceivers (150) of the control interface (200) of one or more columns (2) to form an association. After individual columns (2) associate with the lift system (1), control module (300) or wireless pendant (400) is then capable of directly controlling each individual column (2) within the lift system (1) as a whole, as part of a lift subsystem (9), or individually. The level of control in which control module (300) or wireless pendant (400) has over each individual column (2) may depend on the type of connection that exists between the control module (300) or wireless pendant (400) and each individual column (2). For example, if control module (300) or wireless pendant (400) associates a location with each individual column (2), then a lift subsystem (9) may be formed, as control module (300) or wireless pendant (400) would know which columns (2) are associated with each axle of a vehicle.

A. Exemplary Simple Setup

Figure 11:
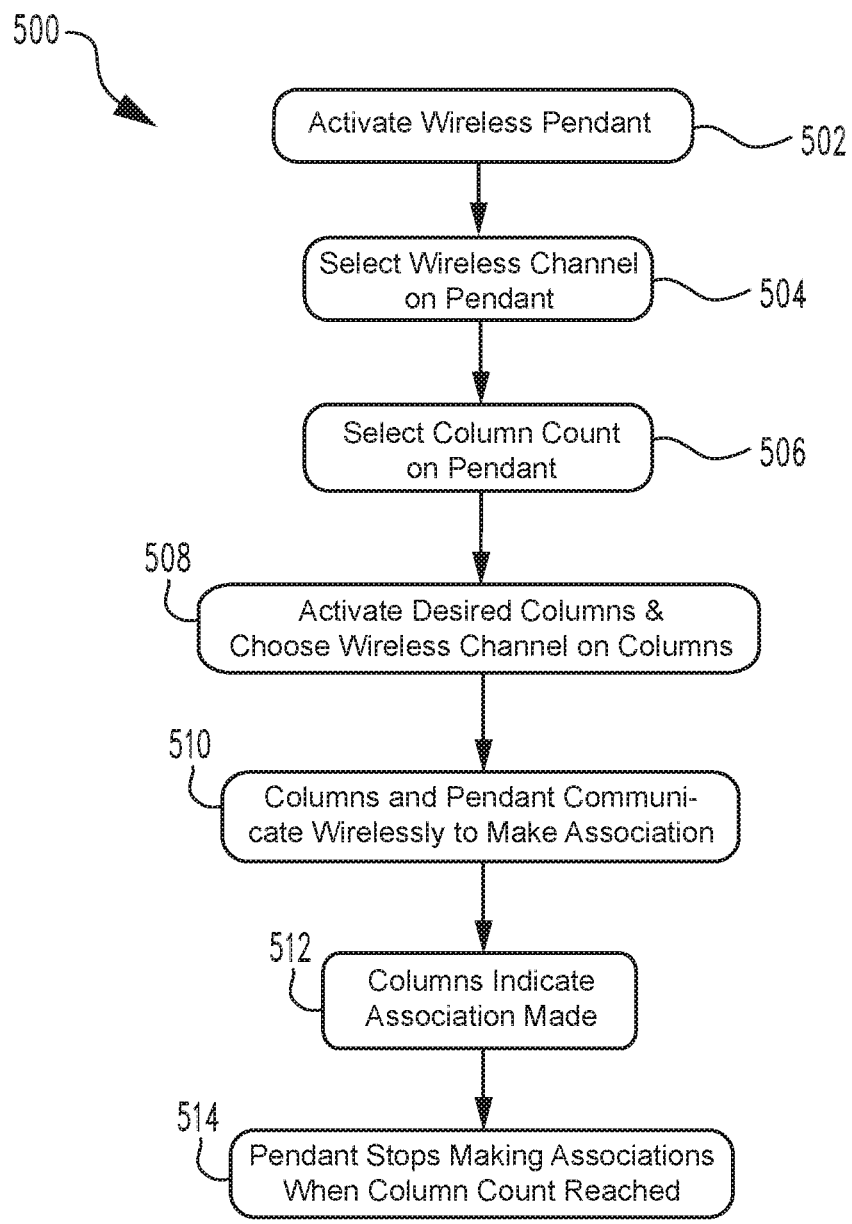
FIG. 11 shows a flowchart of an exemplary simple setup process that may be implemented in the exemplary lift system of FIG. 1.

FIG. 11 shows an exemplary simple set up process (500) of individual columns (2) associating with control module (300) or wireless pendant (400) to form system (1) without designating a location for each of the columns (2). While in the current example wireless pendant (400) is used during exemplary simple set up process (500), it should be understood that control module (300) may also be used, as will be understood by those skilled in the art.

First, an operator may position individual columns (2) in their desired physical locations, as, for example, the positions shown in FIG. 1. Of course, while four columns (2) are shown in FIG. 1, it should be understood that any other suitable number of columns (2) (e.g., two, six, eight, etc.) may be used to form lift system (1). With columns (2) placed in the desired locations, a user is now ready to start simple set up process (500). It should be understood that placing individual columns (2) in their desired locations prior to simple set up process (500) is merely optional. Of course, a user can place columns (2) in their desired location any time after simple set up process (500) has started.

In some embodiments, each wireless pendant (400) communicates with the columns (2) with which it is associated using a fixed system identifier (which, in various embodiments, is a particular physical/real frequency, channel, virtual frequency, or combination thereof). In some such implementations, the columns (2) are configured to operate using the particular system identifier of wireless pendant (400) at the time of manufacture. In others, wireless pendant (400) communicates its fixed system identifier to each column (2) during the process of associating the column (2) with the wireless pendant (400). In still others, the system identifier that wireless pendant (400) uses is either selected at setup time or determined empirically using signal measurements as will occur to those skilled in the art.

In starting simple set up process (500), a user may activate (502) wireless pendant (400). As mentioned above, wireless pendant (400) may be activated by pressing power button (404). With wireless pendant (400) activated, a user may utilize numeral selector (408) to select a wireless channel (504) for wireless pendant (400) to communicate with wireless transceivers (150). A user may utilize numeral controls (411) to scroll through a range of wireless channels displayed on numeral display (409). When a user has manipulated numeral controls (411) so that the desired channel appears on numeral display (409), the user may press numeral selector (408) to select the displayed wireless channel for wireless pendant (400) to communicate. In other words, in embodiments where the system identifier of wireless pendant (400) is not fixed, numeral selector (408) allows a user to choose on what frequency wireless transceiver (450) operates. A selected wireless channel may be utilized for exclusively creating associations between wireless pendant (400) and columns (2), or the selected wireless channel may be utilized for additional communication purposes such as wireless pendant (400) lifting or lowering selected columns (2) in system (1).

In some embodiments, wireless pendant (400) works with a fixed number of columns (2), so wireless pendant (400) is associated with that fixed number of columns (2) using any of the techniques described herein or as will occur to those skilled in the art. In other embodiments, a variable number (for example, 2, 4, 6, or 8) of columns (2) can be used with wireless pendant (400), so next, a user may then utilize numeral selector (408) to select a column count (506) on wireless pendant (400). As such, a user may utilize numeral controls (411) to scroll through a range of available column counts displayed on numeral display (409). When a user sees the desired column count on numeral display (409), the user may press numeral selector (408) to select that number of columns (2) for system (1). Alternatively, a user may utilize buttons on column avatar (402) to also select column count (506). Column count (506) corresponds with the number of columns (2) that will be utilized within system (1). While a user in the current simple set up process (500) first selects a wireless channel on pendant (504) and then selects a column count on pendant (506), one should understand this order is merely optional. Of course, a user could select a column count on pendant (506) and then select a wireless channel at some later time.

With the wireless channel selected (504) and column count selected (506) on wireless pendant (400), a user may then activate the particular columns (2) to be used and for each of them select a wireless channel (508) on the respective control interface (200) for the transceiver (150) to use to communicate with wireless pendant (400). In one exemplary system, a user may walk to each column (2) and power on column (2) via its control interface (200). The number of columns (2) a user activates in this embodiment should match the previously selected column count (506). A user may use control interface (200) to select the desired wireless channel (508) that transceiver (150) will use to communicate. In other words, control interface (200) allows a user to choose on what frequency the corresponding wireless transceiver (150) operates. A selected wireless channel may be utilized for exclusively creating associations between wireless pendant (400) and columns (2), or the selected wireless channel may be utilized for additional communication purposes such as wireless pendant (400) actuating selected columns (2) in system (1) after system (1) is set up.

At this point, both wireless pendant (400) and activated columns (2) are searching to make an association. If both wireless pendant (400) and activated columns (2) have their transceivers (450, 150) set to the same channel, the wireless pendant (400) and activated columns (2) will make an association (510), at which point columns (2) use indicator (210) to indicate (512) to a user that the association (510) has been made. Indicator (210) on activated columns (2) may light-up and/or make sounds, or may use any other suitable method of indication that will occur to a person having ordinary skill in the art in view of the teachings herein. Once wireless pendant (400) makes the number of associations corresponding to the preselected column count (506), or if the user presses a "system lock" button (not shown) to indicate they are done selecting columns, or if any of the other set-completion events discussed herein occur, then wireless pendant (400) automatically completes the associations and prepares the collection for operation as system (1). Wireless pendant (400) is now ready to control the recently defined system (1).

Additionally or alternatively, system (1) may be configured so that a user, at any time, can press a button on wireless pendant (400) and each associated column will activate its respective indicator (210) to confirm its association with the wireless pendant (400) in system (1).

Additionally or alternatively, after an original association is made and system (1) is locked, columns (2) and wireless pendant (400) in system (1) may be able to synchronously change their complementary channels of communication. For example, such a change of complementary channels may be made if a certain number or rate of errors are encountered on their original communication channels, suggesting that interference is occurring. In some implementations of this feature, the new channel(s) are communicated among columns (2) and wireless pendant (400) along with the intended timing for the change, then each of the components automatically changes its communication frequency at the communicated time. In other implementations, a deterministic pattern for such frequency changes is established in the programming or other configuration of the components, so only the timing needs to be communicated (because the next communication frequency can be inferred).

In exemplary simple set up process (500), wireless pendant (400) does not associate with columns (2) in any specific order nor otherwise expressly or impliedly determine the physical position of each column (2). In such systems, therefore, wireless pendant (400) cannot control the columns (2) individually, but only operates them as a group. In alternative embodiments, in order for wireless pendant (400) to be able to control the column (2) in a specific location relative to the object being lifted, so to identify the location of an individual column (2) in relation to other identified columns (2) and the object being lifted to form a subsystem (9), some type of position locator will be needed, whether explicit (such as a GPS), relative (such as by communication of individual location or triangulation among columns (2), or by associating the columns (2) with wireless pendant (400) in a way that specifies the relative location of that column (2)), or implicit (such as by associating the columns (2) with wireless pendant (400) in a particular order during setup).

B. Exemplary Sequenced Setup

Figure 12:
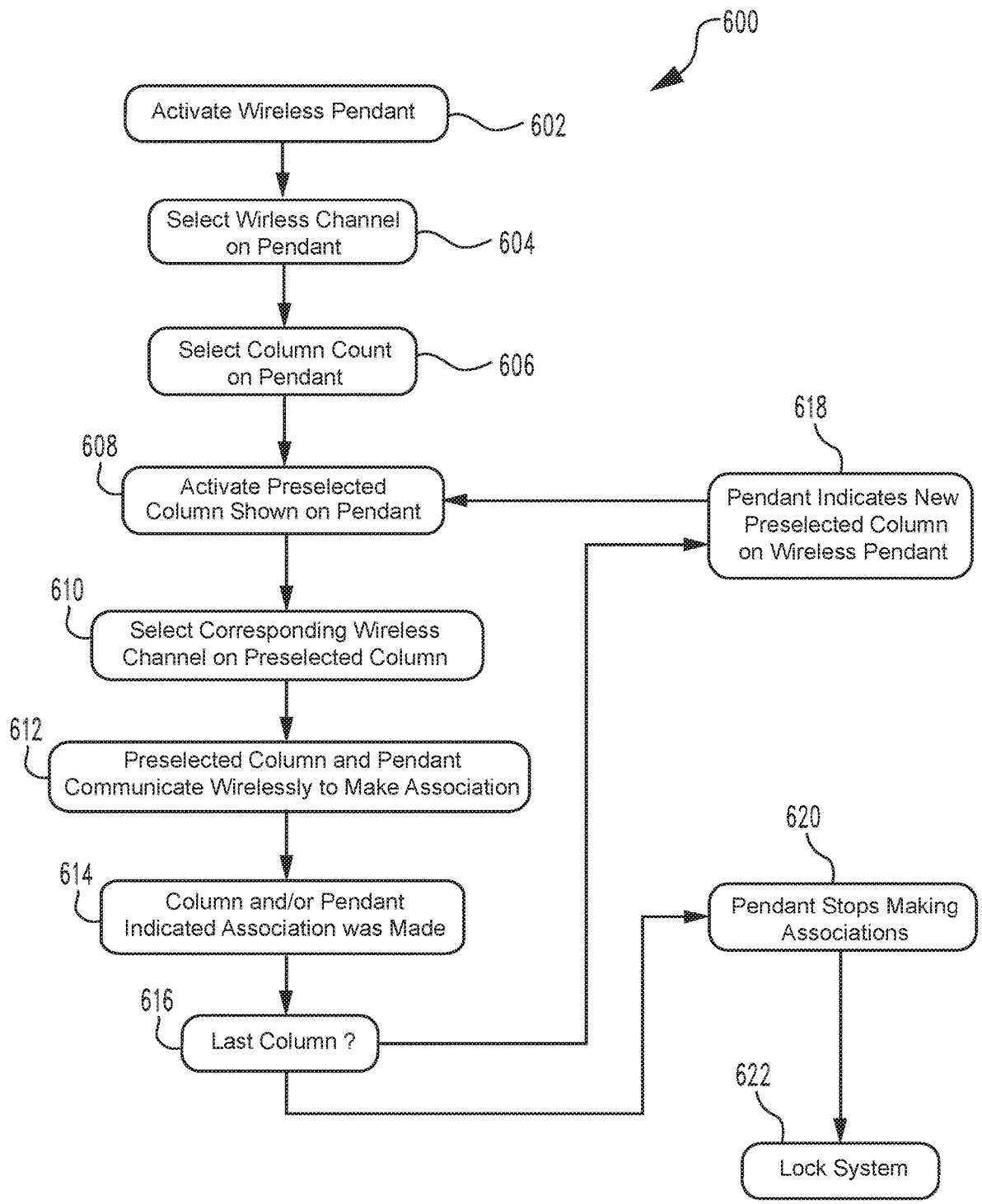
FIG. 12 shows a flowchart of an exemplary sequenced setup process that may be implemented in the exemplary lift system of FIG. 1.

FIG. 12 shows an exemplary sequenced setup process (600) whereby individual columns (2) associate with control module (300) or wireless pendant (400) to form system (1) while also designating the locations of individual columns (2) relative to the object being lifted. While in the current example, wireless pendant (400) is used during exemplary sequenced setup process (500), it should be understood that control module (300) may be used in other embodiments.

First, an operator may set individual columns (2) in their desired locations, similar to that shown in FIG. 1. Of course, while four columns (2) are shown in FIG. 1, it should be understood that any other suitable number of columns (2) (e.g., six, eight, etc.) may be used to form lift system (1). Similarly, it will be understood that columns (2) might be moved during or after the setup process, whether it is before, during, or after each is associated with control module (300) or wireless pendant (400).

To start sequenced setup process (600), a user may activate (602) wireless pendant (400). As mentioned above, wireless pendant may be activated by pressing power button (404). With wireless pendant (400) activated, a user may use numeral selector (408) to select a wireless channel (604) for wireless pendant (400) to communicate with wireless transceivers (150). The user may operate numeral controls (411) to scroll through a range of wireless channels displayed on numeral display (409). When the user sees the desired channel on numeral display (409), the user may press numeral selector (408) to lock in the wireless channel that wireless pendant (400) will use to communicate. In other words, numeral selector (408) allows the user to choose which frequency wireless transceiver (450) operates on. A selected wireless channel may be used only for creating associations between wireless pendant (400) and columns (2), or the selected wireless channel may be used for additional communication purposes, such as wireless pendant (400) actuating selected columns (2) in system (1) after the system (1) is set up.

Next, the user may then use numeral selector (408) to select a column count (606) on wireless pendant (400). As such, the user may operate numeral controls (411) to scroll through a range of available column counts displayed on numeral display (409). When the user sees the desired column count on numeral display (409), they may press numeral selector (408) to lock in the number of columns (2) in system (1). Alternatively, the user may utilize buttons on column avatar (402) to select the column count (606). Column count (606) corresponds with the number of columns (2) that will be utilized in system (1). While the user in the current sequenced setup process (600) first selects a wireless channel on pendant (604) and then selects a column count on pendant (606), one should understand this order is merely optional. Of course, the user could select a column count on pendant (606) and then select a wireless channel on pendant (604).

Figure 13:
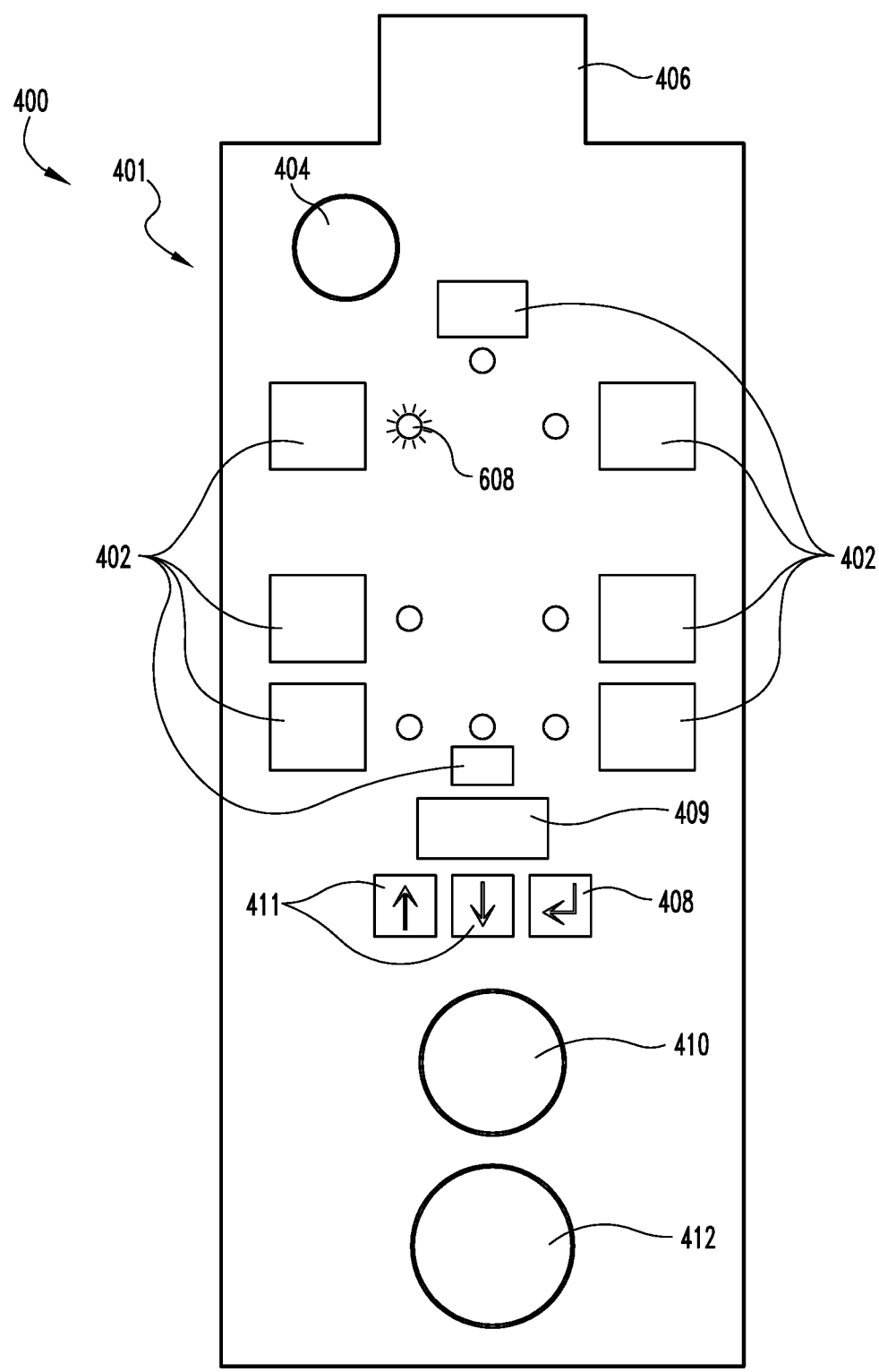
FIG. 13 shows a top view of the wireless pendant of FIG. 6 being used in the sequenced set up process of FIG. 12.

With the wireless channel selected (604) and the column count selected (606) on wireless pendant (400), the user is then notified via column avatar (402) which column (2) should be activated first (608). To do so, as shown in FIG. 13, column avatar (402) lights up the graphical representation of the position of the individual column (2) to be activated first. The user may refer to this information displayed on column avatar (402) and walk to the corresponding column (2) represented on column avatar (402). The user may then turn on the corresponding column (2) and select a wireless channel (610) on its control interface (200) for its transceiver (150) to use for communication with wireless pendant (400). In other words, control interface (200) allows the user to choose the frequency on which wireless transceiver (150) operates. A selected wireless channel may be used exclusively for creating associations between wireless pendant (400) and columns (2), or the selected wireless channel may also be used for additional communication purposes such as wireless pendant (400) actuating selected columns (2) in system (1) once the system (1) is set up.

At this point, both wireless pendant (400) and the first activated column (2) are searching to make an association. If wireless pendant (400) and the first activated column (2) have their transceivers (450, 150) on complementary channels, the wireless pendant (400) and the first activated column (2) will make an association (612), at which point that column (2) activates indicator (210) to indicate (614) that the association (612) has been made. Indicator (210) on first activated column (2) may light up, make one or more sounds, or use a combination of both or any other suitable method of indication that would occur to a person having ordinary skill in the art in view of the teachings herein. Indicator (210) thus gives confirmation to the user that first column (2) has properly made an association with wireless pendant (400).

Next, wireless pendant (400) determines whether the individual column (2) that just associated (612) with wireless pendant (400) is the last column (2) that needed to be associated with system (1) to achieve the user-entered column count (606). If it was, wireless pendant (400) stops attempting to make associations (620) and completes its preparation for operation of system (1) (622). If it was not the last column (2) needed, wireless pendant (400) indicates the next column for activation (618) by means of column avatar (402).

Figure 14:
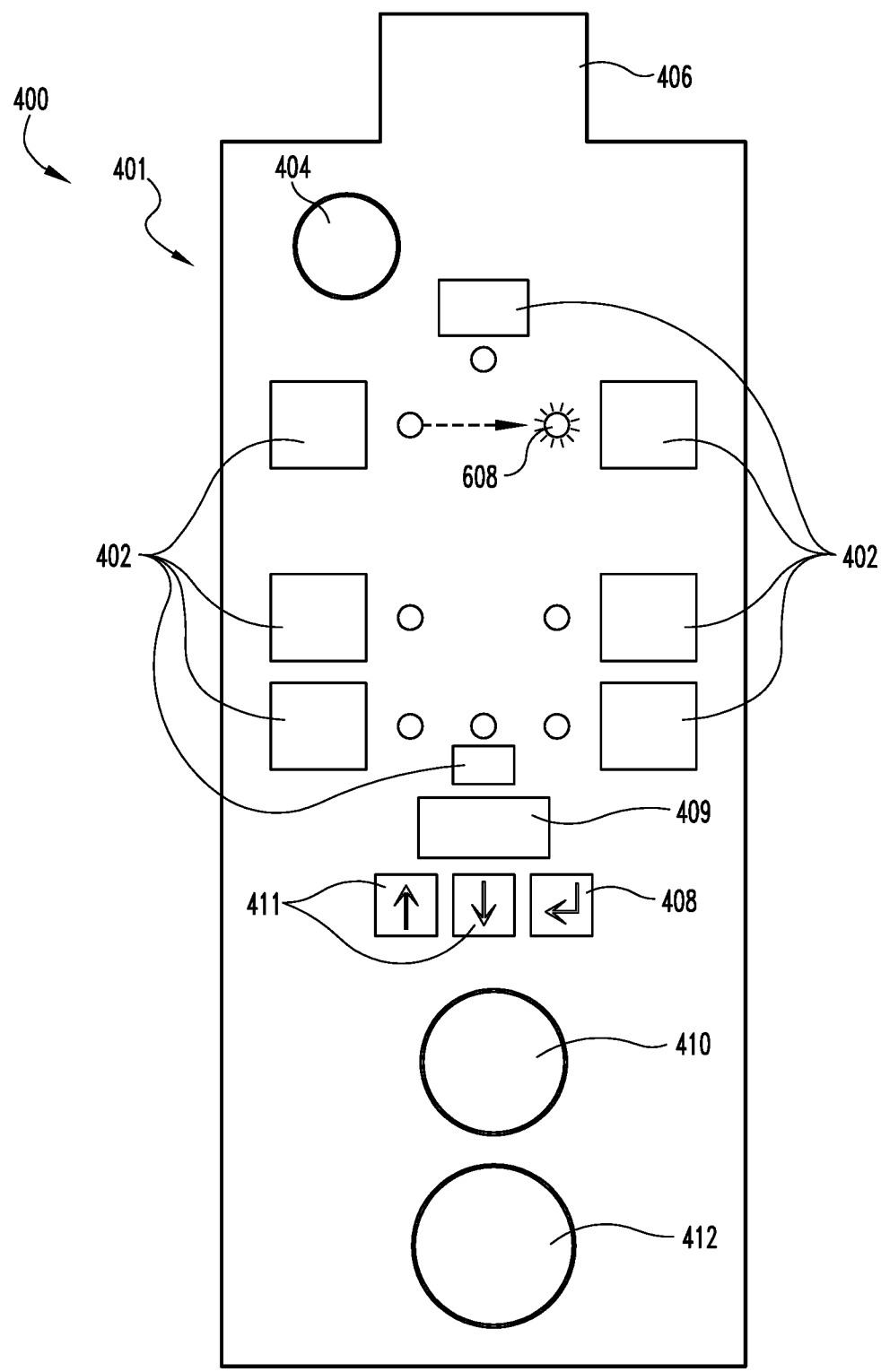
FIG. 14 shows a top view of the wireless pendant of FIG. 6 being used in the sequenced set up process of FIG. 12.

With new preselected column (618) displayed on column avatar (402), the user is notified as to which preselected column should be activated second (608). As such, as shown in FIG. 14, column avatar (402) lights up the graphical representation of the individual column (2) to be activated second. A user may use this information displayed on column avatar (402) and walk to the corresponding column (2) represented on column avatar (402). The user may then activate the corresponding column (2) and select a wireless channel (610) on control interface (200) for transceiver (150) to use to communicate with wireless pendant (400) as described above.

At this point, both wireless pendant (400) and second activated column (2) are searching to make an association. If wireless pendant (400) and second activated column (2) have their transceivers (450, 150) on complementary channels, the wireless pendant (400) and second activated column (2) will make an association (612), at which point column (2) uses indicator (210) to indicate (614) that the association (612) has been made. Indicator (210) on second activated column (2) may light up, make sounds, or use a combination of both or any other suitable method of indication that would occur to a person having ordinary skill in the art in view of the teachings herein. Therefore, indicator (210) confirms that the second column (2) has properly been associated with wireless pendant (400).

In some variations of this embodiment, the system (1) adapts the direction of the sequence of selection of columns (2) around the vehicle as a function of the user's first two selected columns (2). For example, if the user is notified to activate second (608) the column (2) that is positioned clockwise from the first-selected column (2), but the user instead goes to and activates (608) the column (2) that is positioned counterclockwise from the first-selected column (2), then the next column the user is prompted to activate is the column (2) that is counterclockwise from the second-selected column (2).

The user may repeat this process until the amount of columns (2) activated and associated with wireless pendant (400) reaches the previously entered column count (606), at which point wireless pendant (400) stops attempting to make associations (620) and completes its preparation for operation of system (1) (622).

It should be noted that the sequence in which individual graphical representations in column avatar (402) light up may be based in part or entirely on the column count (606) entered by the user. In other words, wireless pendant (400) may define the route a user makes in activating columns based on the column count (606) selected. Alternatively, a user may be able to define their own desired sequence by pressing buttons on column avatar (402) in the sequence in which the user wishes to activate corresponding columns (2). In other words, a user may determine the sequence in which columns (2) should be activated, thereby specifying the location of each column (2) in a more manual fashion.

In sequenced setup process (600), wireless pendant (400) infers the location of each column (2) based on the order in which the columns (2) are activated and associated with wireless pendant (400). In such embodiments, as the columns (2) are associated with wireless pendant (400) to form system (1), wireless pendant (400) may identify subsystems (9), giving system (1) further functionality associated with subsystems (9) as described above.

In an alternative embodiment, association between wireless pendant (400) and a particular column (2) during formation of a system (1) is triggered when a computer-readable identifier on the column (2) is read by a suitable reading device that is either on or in communication with wireless pendant (400). For example, a barcode, QR code, RFID tag, or Bluetooth LE transmitter on the column (2) might be read by and a laser scanner, RFID reader, or Bluetooth LE receiver built into wireless pendant (400). The information in that code, tag, or transmitter in one such embodiment enables wireless pendant (400) to communicate with the column (2) and its processor (120) to both establish communication parameters (including, for example, transceiver frequencies) and share identifying information to be used by wireless pendant (400) as it controls operation of column (2).

In other embodiments, the identifier is associated with wireless pendant (400), and the association is triggered by a suitable reading device associated with a particular column (2) reading that identifier. In some of these embodiments, this reading event transfers information from wireless pendant (400) to the column (2), which uses the information to establish a communication channel with wireless pendant (400), share and identifier for the column (2), tune its transceiver to a given frequency, and the like.

In still other embodiments, the relative position of each selected column (2) around the vehicle is automatically determined by triangulation of wireless signals that are generated by and/or received at each column (2) in relation to other columns (2), centralized control module (300), and/or other wireless signal sources, or by other techniques that will occur to those skilled in the art in view of this disclosure.

Regardless of which object reads information from which other object, a system (1) is established by a series of these associations. In some embodiments, a user goes around to each of the columns (2) that are to be associated in the system (1), performing the aforementioned reading actions as to each. When all identifiers have been read (or when the identifier of the wireless pendant (400) has been read by each column (2)), the associations are completed, for example, by actuation of an "end" button (not shown) on one or more of the components, re-reading of the first identifier in the set (or, analogously, reading of the identifier of wireless pendant (400) by the first column (2)), or a determination that a previously specified number of columns (2) have now been selected.

In some embodiments, columns (2) are associated with wireless pendant (400) in a particular order that implies the relative position of each column (2) in relation to the object being lifted and to each other. In some of these embodiments, the association of each column (2) in the sequence is confirmed or acknowledged by the same signal, while in others the confirmations/acknowledgments are different (e.g., one beep, two beeps, three beeps, etc.).

In some embodiments, wireless pendant (400) infers the association of particular columns (2) with opposite ends of a particular axle for the order in which the columns (2) are selected. For example, an even number of columns (2) might be selected beginning in one corner and proceeding in a "U" pattern around the vehicle (e.g., from front to back along the left side, then from back to front along the right side). The system infers that the middle two columns (2) are on opposite ends of the same axle, then the columns (2) before and after them are on opposite ends of the next axle, and so on until the first and last columns (2) that were selected are presumed to be on the same axle. Each axle pair can be automatically configured by these embodiments as a subsystem (9).

IV. Reactivation of System

After wireless pendant (400) has set up system (1) and associations among columns (2) and wireless pendant (400) have been initially made, system (1) or wireless pendant (400) may go into "sleep mode" after non-use of system (1) for a predetermined amount of time. In such situations, system (1) or wireless pendant (400) must be reactivated in order to actuate columns (2).

Such reactivation may require wireless pendant (400) and columns (2) to reestablish their association. Reestablishing association may begin when a user presses reactivation button (412) on wireless pendant (400). When the user presses reactivation button (412), wireless pendant (400) may transmit an association signal on its previously selected communication channel. If columns (2) are still available (by not having joined another system (1) while wireless pendant (400) was in sleep mode) and awake, columns (2) will re-associate with wireless pendant (400) to reestablish the previous system (1). In some embodiments, each column (2) stores some or all of the information needed to rejoin the system (1) in nonvolatile memory, so when the components of system (1) are reactivated, each column (2) attempts to reconnect using the same information, and they find each other. In some embodiments, association information is stored in wireless pendant (400), and when wireless pendant (400) restarts, it attempts to reconnect using that information. In some embodiments, association information is stored elsewhere using the data networking capabilities of wireless pendant (400) and/or other components. Other places where association information may be stored will be apparent to a person having ordinary skill in the art in view of the teachings herein.

In some embodiments, instead of pressing reactivation button (412) on wireless pendant (400) to reestablish association, a user may be required to press a sequence of buttons to reactivate. In some embodiments, a user may have to press a button on a column (2) and a button on wireless pendant (400) at the same time in order to reactivate the system (1). In some embodiments, a user may have to press a button on one or more columns (2), then within a specified time press a button on wireless pendant (400) to begin reactivation. In some embodiments, a user may have to press a button on wireless pendant within a specified distance of system (1) to reactivate it. In some embodiments, a user must re-enter the appropriate amount of columns (2) to reactivate. In some embodiments, a user must re-enter the appropriate channel of communication that wireless pendant (400) and/or columns (2) are using either wireless pendant (400) or in one or more columns (2) to automatically reestablish system (1). Other methods of reactivation will be apparent to a person having ordinary skill in the art in view of the teachings herein.

In some embodiments, if all columns (2) are available, indicator (210) on the reactivated columns (2) may light-up, make sounds, or use a combination of both or any other suitable method of indication that would occur to a person having ordinary skill in the art in view of the teachings herein. In some embodiments, if only a portion of columns are available, indicators (210) on available columns (2) may light-up, make sounds, or use a combination of both or any other suitable method of indication that would occur to a person having ordinary skill in the art in view of the teachings herein to indicate the availability of a partial reactivation. In some embodiments, if all previously associated columns (2) are available, column avatar (402) on wireless pendant (400) may light up to indicate which columns (2) and/or positions are ready and which need to be reactivated. In some embodiments, if only a portion of columns are available, column avatar (402) may light up sections corresponding to only those columns (2) that are available. In some embodiments, if only a portion of columns are available, column avatar (402) may light up green for sections corresponding to available columns (2) and light up red for sections corresponding to unavailable columns (2).

In some embodiments, user input may be required after column re-association has occurred before the system (1) can be used. Any of the user input methods mentioned above could be utilized in order to confirm the re-association.

In some embodiments, if pendant (400) or any column (2) in system (1) cannot connect with the information it had saved from its pre-sleep association, the wireless pendant (400) or column (2) may automatically switch to an unassociated state. Optionally, if wireless pendant (400) or any column (2) in system (1) cannot connect with information it has saved from its pre-sleep association, all elements in system (1) may switch to an unassociated state. Then, in some embodiments, if the wireless pendant (400) or column (2) is turned off and back on again (or goes to sleep and is reactivated) that component tries again to reconnect system (1) using the previously saved association configuration. In other embodiments, if the wireless pendant (400) or column (2) is turned off and back on again (or goes to sleep and is reactivated) that component deletes the saved association configuration and no longer attempts to reassociate with system (1) until it goes through another setup process. In still other embodiments, if a pendant (400) or column (2) cannot connect to the rest of system (1) when it tried to resume, it may simply wait, staying tuned to the appropriate communication channel in case other elements of system (1) are reactivated.

While in the current examples, wireless pendant (400) is used during exemplary sequenced setup process (500), it should be understood that control module (300) may be used in place of wireless pendant (400).

V. Clear Channel Assignment Process

In some instances, it may be desirable to find the best channel of wireless communication for system (1). In some instances, a user may not be aware of the quality of data transfer of specific channels of communication. Therefore, it might be helpful to have an automated process that identifies clear channels of wireless communications between wireless pendant (400) and columns (2).

Figure 15:
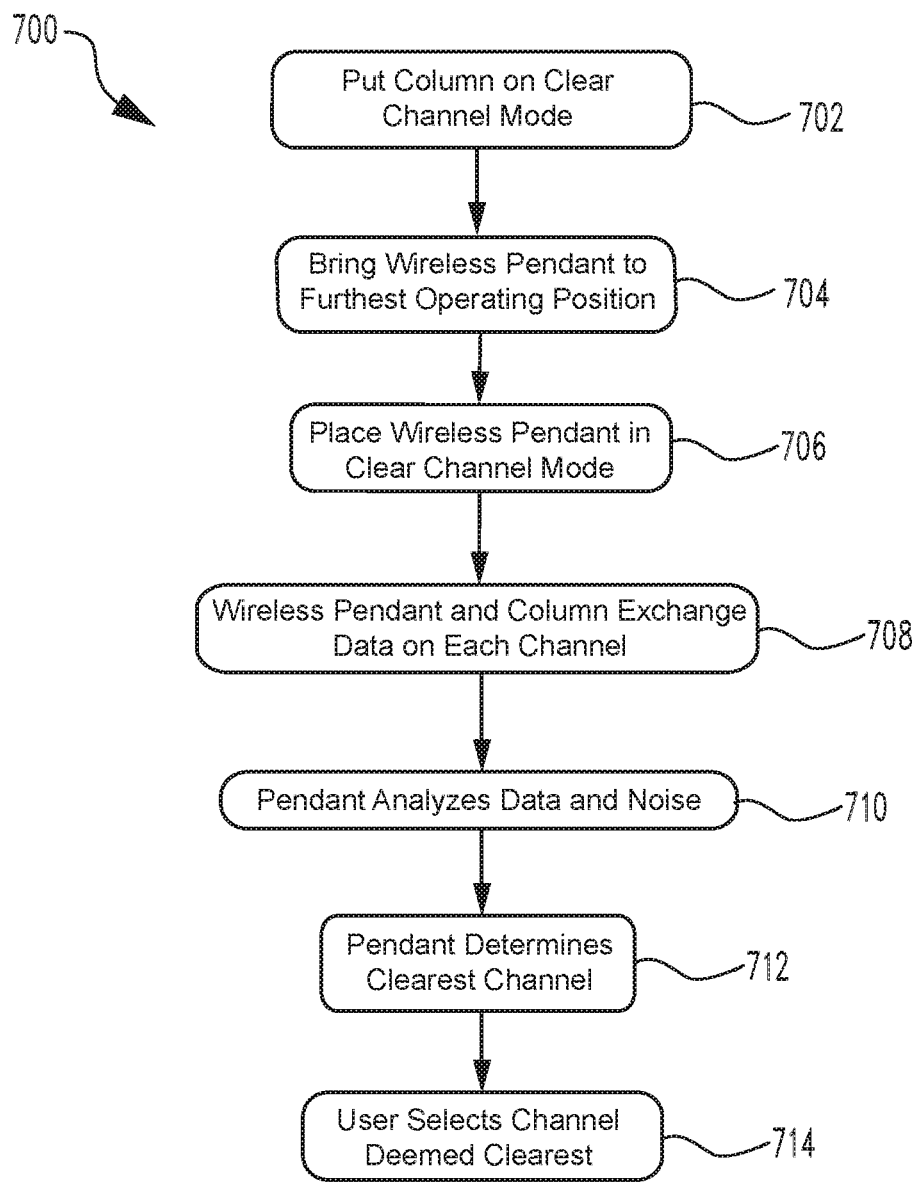
FIG. 15 shows a flowchart of an exemplary clear channel selection process between a wireless pendant and wireless columns.

FIG. 15 shows an exemplary process for determining clear channels of wireless communication between column (2) and wireless pendant (400). First, a user may manipulate interface (200) to put column (2) into a clear channel mode (702). Then, the user may take wireless pendant (400) to the farthest distance (704) from column (2) in which the user wishes to use wireless pendant (400) with column (2). With wireless pendant (400) at the farthest distance of desired operation (704), the user may place wireless pendant (400) in clear channel mode (706) as well. With both wireless pendant (400) and column (2) in clear channel mode, both exchange data, sending and receiving data packets, then cycling through each channel and repeating the exchange of data (708). In this embodiment, processor (420) in wireless pendant (400) analyses the quality of the data transfer (710), for example, in terms of correct and incorrect data packets received and noise. With data transfer analyzed (710), wireless pendant (400) determines all available clear channels (712) by comparing analyzed data (710) with a predetermined standard. User is then given the option of selecting channel deemed clearest (714) or any other channel desirable if the clearest channel is already in use.

VI. Additional Alternatives

When there is a height difference between the carriages (6) and they receive a "lower-to-lock" command, it is possible that one carriage (6) might be higher than another such that the higher carriage (6) might be above a particular lock hole (254), while a lower carriage (6) might be below its corresponding lock hole (254) of the same height. (In alternative embodiments, it is assumed that there will always be a difference between the heights of carriages (6) at the moment they receive a "lower-to-lock" command.) Thus, as they both lowered their respective carriages (6), locking the corresponding lock member (262) in the next-lower lock hole (254) they encounter would yield non-level support for the vehicle being lifted. Therefore, in some embodiments, the lock member (262) in the locking assembly (200) for the higher carriage (6) is held open until it is lowered past the original level of the lowest carriage (6) in the system (1). In other embodiments, the higher carriage (6) is lowered with its lock member (262) open until all carriages (6) are at the same height, then all carriages (6) are lowered together to the next lower lock hole (254).

In some embodiments, wired communications provide redundancy for wireless communications of set-association information, telematics, and/or control communications between some or all columns (2) and/or between one or more columns (2) and a control module (300).

In various embodiments, management information and other operational data are collected and distributed via the data transfer capabilities of control module (300) or wireless pendant (400). Such information and data may be collected and distributed through these components as otherwise described in U.S. Pat. No. 7,191,038 (filed on Jul. 14, 2004, with title "Electronically Controlled Vehicle Lift and Vehicle Service System"), which is hereby incorporated by reference herein.

In other embodiments, the wireless pendant's (400) the control module's (300), and each column's (2) wireless communication channels are used to obtain over-the-air updates for all or part of the device's control software. In some implementations, the software is downloaded from an on-site resource, such as wireless pendant (400), control module (300), network accessible storage (NAS) server, or a specially adapted, communication-enabled program storage device. In other implementations, the software is downloaded from an off-site resource by way of one or more data network components as will occur to those skilled in the art in view of this disclosure. In still other implementations, updates are at least sometimes obtained by a column (2) from or through another column (2).

Some embodiments of the present system enable delayed or remote observation or collection of data about the status and/or operation of each column (2). Some of these embodiments allow a computing device (such as a desktop computer, laptop, tablet, smart phone, or server) to access the data via either data storage local to the system or remote access via standard data networking devices or data storage/transfer devices that are specially adapted to operate with the present system on a store-and-retrieve, store-and-forward, remote aggregation, or remote access basis. In various embodiments, the status and/or operation data includes the column's (2) and/or system's (1) state and history of activation, height, weight, power supply status, selected channel, frequency of the data transceiver's operation, data transfer rate, data transfer errors, and other statistics as will occur to those skilled in the art in view of this disclosure. The data monitoring and access features described in U.S. Pat. No. 7,191,038 are hereby incorporated by reference and may be integrated with the system as will occur to those skilled in the art in view of this disclosure.

In some embodiments of the present system, at least one column (2) includes a display (202) that shows a "ticker" of information that might be helpful for the user. A variety of kinds of information will occur to those skilled in the art, including without limitation the currently selected system identifier, the height of the column (2), the weight on that particular column (2), and the aggregate weight on all of the columns (2) of the lift system (1).

Still other embodiments include a "find controller" button or other interface component on the control interface (200) of at least one column (2). When actuated, the interface component sends a wireless signal to the centralized control module (300), which responds with an audible and/or visual alert to help people find or identify the control module (300) currently associated with the column (2). In some implementations of this feature, the circuitry adapted to receive the wireless signal is integrated in centralized control module (300) along with the structures that provide the audible and/or visual alert. In other implementations such circuitry is not so integrated, such as by attaching to the centralized control module (300) using a pluggable interface or by being part of (or also in) a carrier or container that holds at least part of the centralized control module (300). In any of these forms, the alert circuitry might be powered by the same power source as the centralized control module (300), simplifying the design in some circumstances, or by a different power source, allowing the alert to operate even when the power source of centralized control module (300) is offline or depleted.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A method of setting up a lift system for lifting a vehicle, the lift system comprising a plurality of lifts and a control unit, wherein each lift in the plurality of lifts comprises an actuation assembly, a control interface, and an indicator, and wherein the control unit is configured to communicate with the control interface of each lift in the plurality of lifts in order to coordinate the lift system, the method comprising the steps of:
   (a) activating the control unit;
   (b) activating each lift in the plurality of lifts in a sequence indicated by the control unit, the activating comprising
      (i) notifying the user of a position relative to the vehicle in which a next lift in the plurality of lifts should be placed; and
      (ii) communicating a system identifier between the next lift and the control unit,
   wherein the system identifier is configured to establish a communication network between the control unit and the plurality of lifts to form the lift system.

2. The method of claim 1, wherein:
the plurality of lifts comprise a plurality of mobile lifting columns configured to be selectively positioned relative to each other, and
the method further comprises placing each lift in the plurality of lifts in a position relative to the vehicle according to the notification.

3. The method of claim 1:
further comprising choosing a number of lifts in the plurality of lifts with the control unit, and
wherein each indicator only indicates establishment of the network after communications have been established between the chosen number of lifts.

4. The method of claim 1, wherein the system identifier is fixed per control unit.

5. The method of claim 1, wherein:
the system identifier in not fixed, and
the method further comprises choosing the system identifier from a plurality of system identifiers.

6. The method of claim 5:
wherein a person manually selects the system identifier using the control unit,
wherein each system identifier is associated with a range of wireless frequencies.

7. The method of claim 1, further comprising:
accepting an electronic request for information concerning the status and/or operation of one or more lifts in the plurality of lifts; and
automatically responding to the electronic request with an electronic answer containing the requested information.

8. The method of claim 1, further comprising automatically storing information in a memory concerning the status and/or operation of one or more lifts in the plurality of lifts over time.

9. The method of claim 1, further comprising the control unit basing the position relative to the vehicle in which a next lift in the plurality of lifts should be placed on a determination of the approximate relative positions of the lifts in the plurality of lifts using triangulation of wireless signals.

10. The method of claim 1, wherein the step of activating each lift in the plurality of lifts comprises using a display to guide a user through a predetermined order of lift activation.

11. The method of claim 1, wherein:
the step of activating each lift in the plurality of lifts comprises guiding a user through activation of the next lift in the plurality of lifts, and
the guiding adapts automatically based on the relative positions of a first activated lift and a second activated lift in the plurality of lifts.

12. The method of claim 1, wherein the control unit comprises a wireless controller, the method further comprising:
actuating a "find controller" interface component; and
initiating an audible and/or visual alert on or around the wireless controller.

13. A method of setting up a lift system, the lift system comprising a plurality of lifts and a control unit; wherein each lift in the plurality of lifts comprises an actuation assembly, a control interface comprising a plurality of lift avatars, and an indicator; wherein the control unit is configured to communicate with each control interface of the plurality of lifts in order to coordinate the lift system; the method comprising:
(a) activating the control unit;
(b) activating a first lift in the plurality of lifts, comprising establishing communication between the first lift and the control unit via a system identifier such that (1) the control unit stores the relative location of the first lift and (2) the indicator of the first lift activates;
(c) activating a second lift in the plurality of lifts, comprising establishing communication between the second lift and the control unit via the system identifier such that (1) the control unit stores the relative location of the second lift and (2) the indicator of the second lift activates; and
(d) lighting up a lift avatar in the plurality of lift avatars to indicate which lift in the plurality of lifts should be activated.

14. The method of claim 13:
wherein the plurality of lifts further comprises a plurality of mobile lifting columns configured to be selectively positioned relative to each other, and
the method further comprises placing each lift in the plurality of lifts in a desired position.

15. The method of claim 14:
further comprising directing the control unit to form a first subassembly,
wherein the first subassembly comprises the first lift and the second lift, and
wherein the control unit is configured to unitarily actuate the first lift and the second lift as the first subassembly.

16. The method of claim 15, further comprising:
(a) activating a third lift in the plurality of lifts, comprising establishing communication between the third lift and the control unit via the system identifier such that (1) the control unit stores the relative location of the third lift and (2) the indicator of the third lift activates;
(b) activating a fourth lift in the plurality of lifts, comprising establishing communication between the fourth lift and the control unit via the system identifier such that (1) the control unit stores the relative location of the fourth lift and (2) the indicator of fourth lift activates; and
(c) directing the control unit to form a second subassembly, wherein
the second subassembly comprises the third lift and the fourth lift, and
the control unit is configured to unitarily actuate the third lift and the fourth lift as the second subassembly.

17. The method of claim 16, further comprising:
selecting the first subassembly on the control unit,
actuating the first subassembly with the control unit, then
selecting the second subassembly on the control unit, and
actuating the second subassembly with the control unit.

* * * * *